US012162708B2

(12) United States Patent
Asai et al.

(10) Patent No.: US 12,162,708 B2
(45) Date of Patent: Dec. 10, 2024

(54) SHEET STORAGE DEVICE AND PRINTING APPARATUS

(71) Applicant: CANON KABUSHIKI KAISHA, Tokyo (JP)

(72) Inventors: Yasuyuki Asai, Tokyo (JP); Hiromasa Yoneyama, Chigasaki (JP); Tetsuo Kikuchi, Ayase (JP); Itaru Wada, Yokohama (JP); Daiki Anayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 392 days.

(21) Appl. No.: 17/467,727

(22) Filed: Sep. 7, 2021

(65) Prior Publication Data

US 2021/0403268 A1 Dec. 30, 2021

Related U.S. Application Data

(62) Division of application No. 15/960,961, filed on Apr. 24, 2018, now Pat. No. 11,130,648.

(30) Foreign Application Priority Data

May 12, 2017 (JP) ................................ 2017-095687

(51) Int. Cl.
*B65H 29/52* (2006.01)
*B41J 13/10* (2006.01)
(Continued)

(52) U.S. Cl.
CPC ............ *B65H 29/52* (2013.01); *B41J 13/106* (2013.01); *B65H 23/28* (2013.01); *B65H 31/02* (2013.01);
(Continued)

(58) Field of Classification Search
CPC ........ B65H 23/28; B65H 16/06; B65H 31/20; B65H 2701/11312; B41J 13/106
See application file for complete search history.

(56) References Cited

U.S. PATENT DOCUMENTS 5,188,352 A * 2/1993 Bartman ................ B65H 31/20 271/175
5,484,140 A 1/1996 Hirose et al.
(Continued)

FOREIGN PATENT DOCUMENTS

JP 06-234454 A 8/1994
JP 06-312869 A 11/1994
(Continued)

OTHER PUBLICATIONS

Office Action dated Jul. 6, 2021, in Japanese Patent Application No. 2017-095687.

*Primary Examiner* — Patrick Cicchino
(74) *Attorney, Agent, or Firm* — Venable LLP

(57) ABSTRACT

A sheet storage apparatus and a printing apparatus include simplified mechanisms for supporting a sheet and for guiding the sheet. A sheet storage device that can store a sheet discharged from a discharge port of a printing apparatus includes multiple flappers provided below the discharge port and arranged in a width direction of the sheet, each flapper being rotatable between a first posture in which the sheet discharged from the discharge port is guided downward in a gravitational direction by using a first surface, and a second posture in which the sheet is supported by using a second surface being different from the first surface; and a connecting unit which connects the plurality of flappers to one another.

16 Claims, 21 Drawing Sheets

(51) Int. Cl.
*B65H 23/28* (2006.01)
*B65H 31/02* (2006.01)

(52) U.S. Cl.
CPC .. *B65H 2404/693* (2013.01); *B65H 2405/312* (2013.01); *B65H 2701/11312* (2013.01); *B65H 2701/1311* (2013.01)

(56) References Cited

U.S. PATENT DOCUMENTS

| | | | | |
|---|---|---|---|---|
| 5,553,528 | A | 9/1996 | Zoltner | |
| 8,579,527 | B2 * | 11/2013 | Onuki | B65H 31/20 271/213 |
| 8,622,385 | B2 | 1/2014 | Ueyama et al. | |
| 8,882,104 | B2 | 11/2014 | Ueyama | |
| 9,272,872 | B2 | 3/2016 | Sugiyama et al. | |
| 9,327,529 | B2 * | 5/2016 | Kato | B41J 13/106 |
| 9,434,189 | B2 | 9/2016 | Anayama et al. | |
| 9,540,206 | B2 | 1/2017 | Masuda et al. | |
| 9,580,268 | B2 | 2/2017 | Nagashima et al. | |
| 9,592,683 | B2 | 3/2017 | Kobayashi et al. | |
| 10,457,516 | B2 * | 10/2019 | Ohashi | B65H 31/20 |
| 10,906,764 | B2 | 2/2021 | Yoneyama et al. | |
| 10,967,658 | B2 * | 4/2021 | Yoneyama | B41J 15/046 |
| 2009/0127770 | A1 | 5/2009 | Tamaki | |
| 2009/0185198 | A1 | 7/2009 | Kang et al. | |
| 2009/0295061 | A1 | 12/2009 | Honda et al. | |
| 2011/0062661 | A1 | 3/2011 | Shimonaga | |
| 2013/0034376 | A1 | 2/2013 | Saiga | |
| 2013/0149018 | A1 | 6/2013 | Oh et al. | |
| 2013/0286124 | A1 | 10/2013 | Ueyama | |
| 2013/0286125 | A1 | 10/2013 | Mikuriya et al. | |
| 2013/0306784 | A1 | 11/2013 | Ueyama et al. | |
| 2016/0136976 | A1 | 5/2016 | Shinjo et al. | |
| 2017/0120636 | A1 | 5/2017 | Kobayashi et al. | |
| 2018/0244086 | A1 | 8/2018 | Yoneyama et al. | |
| 2018/0327210 | A1 | 11/2018 | Yoneyama et al. | |
| 2019/0300319 | A1 | 10/2019 | Ohashi et al. | |

FOREIGN PATENT DOCUMENTS

| | | | |
|---|---|---|---|
| JP | 2013-227134 | A | 11/2013 |
| JP | 2015-189522 | A | 11/2015 |

* cited by examiner

SHEET STORAGE DEVICE AND PRINTING APPARATUS

BACKGROUND OF THE INVENTION

Field of the Invention

The present invention relates to a sheet storage device that stores sheets such as discharged printed media, and a printing apparatus including the sheet storage device.

Description of the Related Art

Japanese Patent Laid-Open No. 2015-189522 discloses a printing apparatus which is capable of establishing multiple reception modes by setting a reception member to a drooping state or a horizontal state depending on the size of a sheet to be printed.

According to the printing apparatus disclosed in Japanese Patent Laid-Open No. 2015-189522, a reception member located in the vicinity of the printing apparatus is set to a horizontal state in a predetermined reception mode by causing a guide member to support the receiving member, thereby establishing a state where a discharged sheet is supported by the reception member. Meanwhile, in another reception mode, the reception member is set to a drooping state, thereby establishing a state where the discharged sheet is guided by the guide member. Here, the reception member does not contribute to an operation to store the sheet in this reception mode. As described above, according to the printing apparatus disclosed in Japanese Patent Laid-Open No. 2015-189522, the configuration to support the sheet and the configuration to guide the sheet are formed of different members (the reception member and the guide member), and these members are movably provided independently of each other. For this reason, a space for movement and a position for installation need to be secured for each of the reception member and the guide member. Such requirements would lead to intricate mechanisms of the respective members.

SUMMARY OF THE INVENTION

The present invention has been made in view of the aforementioned problem, and aims to provide a sheet storage device and a printing apparatus, which are provided with a simplified mechanism for supporting a sheet and a simplified mechanism for guiding a sheet.

In the first aspect of the present invention, there is provided a sheet storage device being capable of storing a sheet discharged from a discharge port of a printing apparatus, comprising: a plurality of flappers provided below the discharge port and arranged in a width direction of the sheet, each flapper being rotatable between a first posture in which the sheet discharged from the discharge port is guided downward in a gravitational direction by using a first surface, and a second posture in which the sheet is supported by using a second surface being different from the first surface; and a connecting unit configured to connect the plurality of flappers to one another.

In the second aspect of the present invention, there is provided a printing apparatus comprising: a roll sheet holder configured to rotatably hold a roll sheet; a printing unit configured to perform printing on a conveyed sheet reeled out of the roll sheet held by the roll sheet holder; a discharge port configured to discharge the sheet printed by the printing unit; and a sheet storage device being capable of storing the sheet discharged from the discharge port, wherein the sheet storage device includes a plurality of flappers provided below the discharge port and arranged in a width direction of the sheet, each flapper being rotatable between a first posture in which the sheet discharged from the discharge port is guided downward in a gravitational direction by using a first surface, and a second posture in which the sheet is supported by using a second surface being different from the first surface, and a connecting unit configured to connect the plurality of flappers to one another.

According to the present invention, the reception member has both the configuration to support the sheet and the configuration to guide the sheet. Thus, configurations of a sheet supporting mechanism and a sheet guiding mechanism are simplified.

Further features of the present invention will become apparent from the following description of exemplary embodiments with reference to the attached drawings.

DESCRIPTION OF THE EMBODIMENTS

Figure 1A:
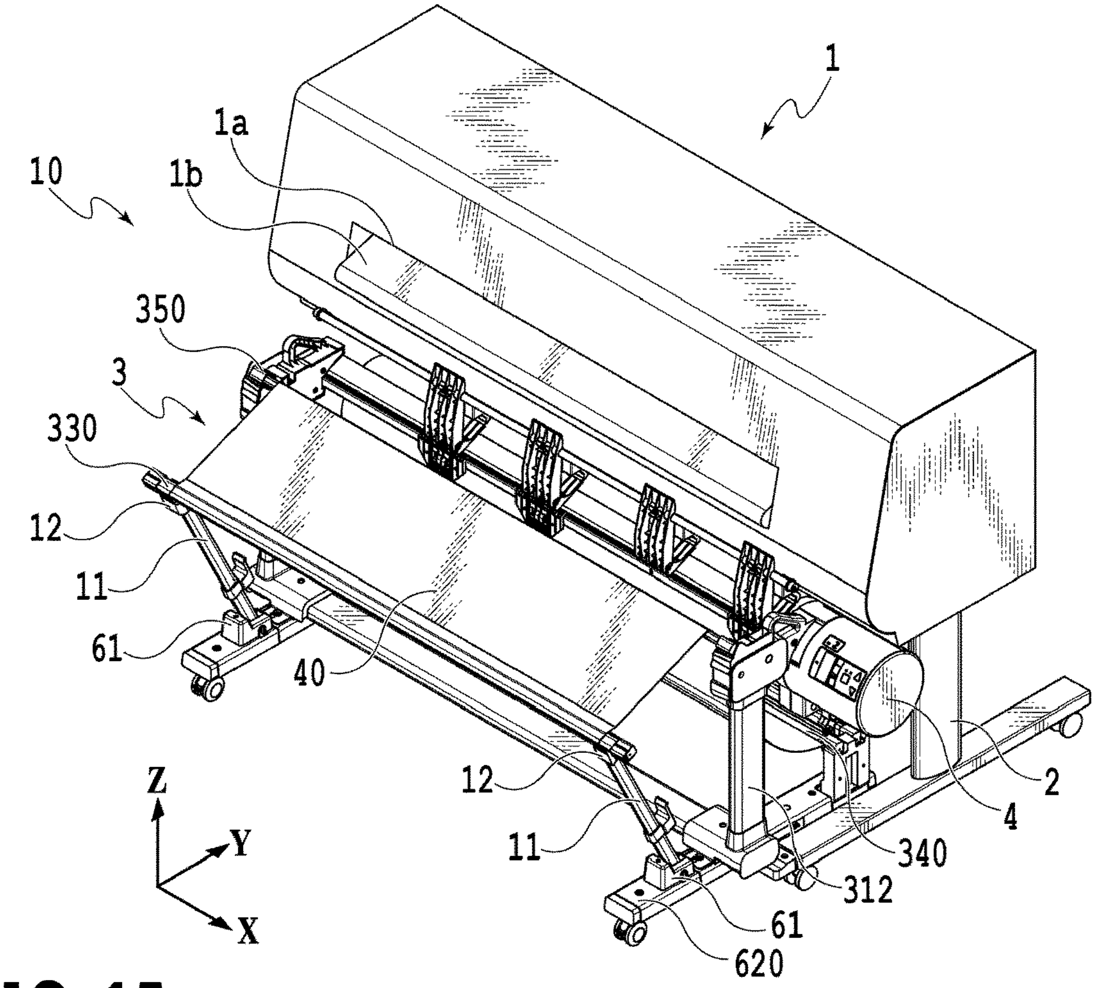
FIGS. 1A and 1B are schematic configuration diagrams of a printing apparatus.
Figure 1B:
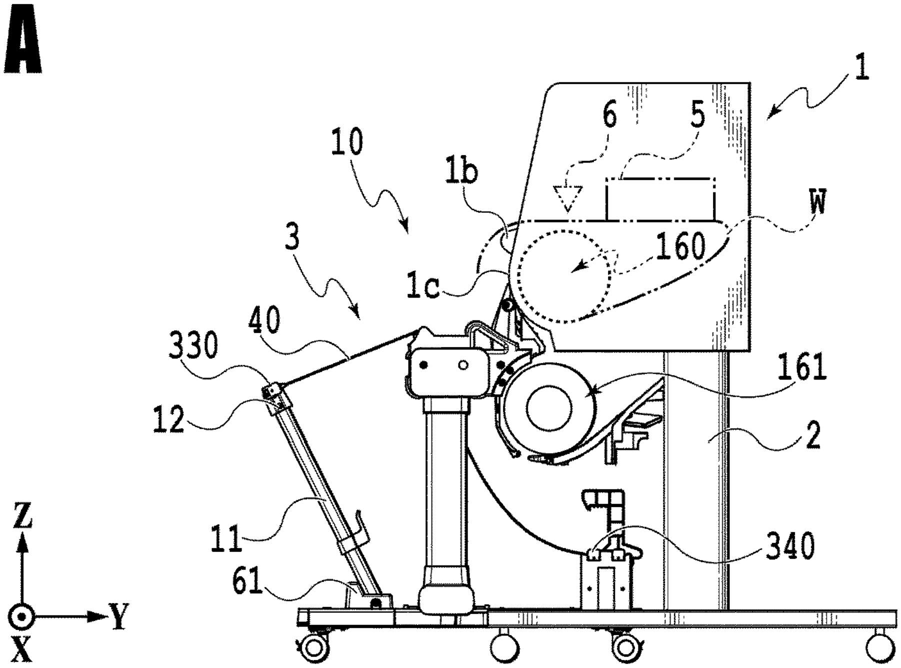
Figure 2A:
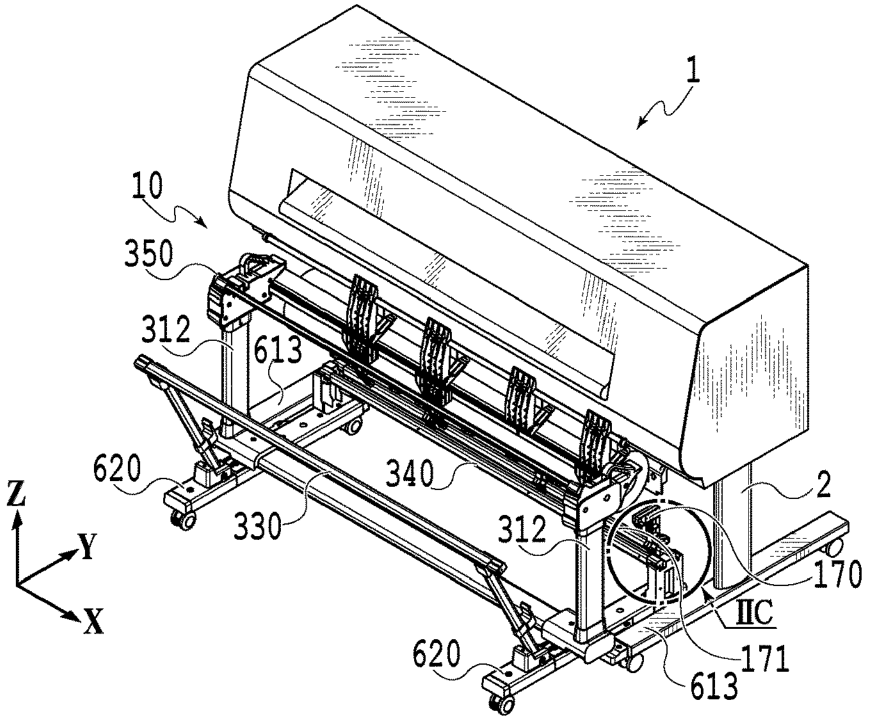
FIGS. 2A, 2B, and 2C are schematic configuration diagrams of a stacker in the printing apparatus and a surrounding part thereof.
Figure 2B:
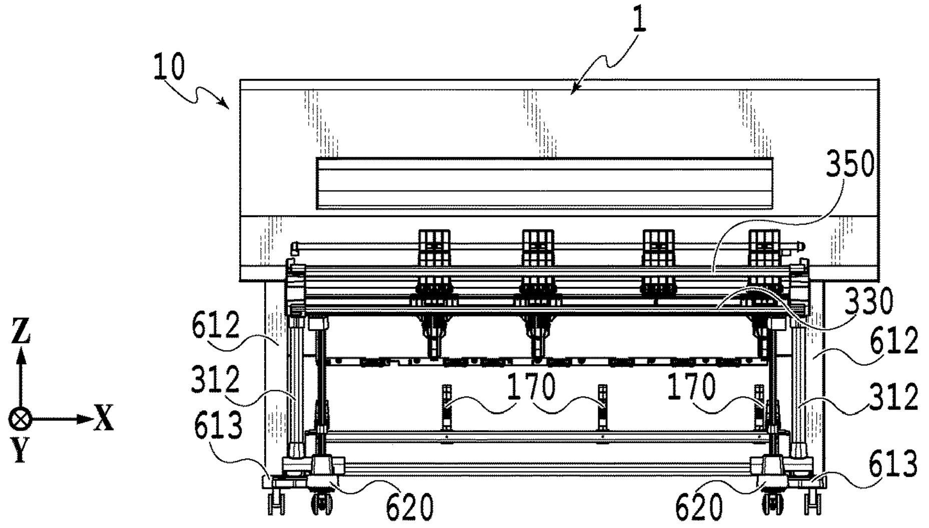
Figure 2C:
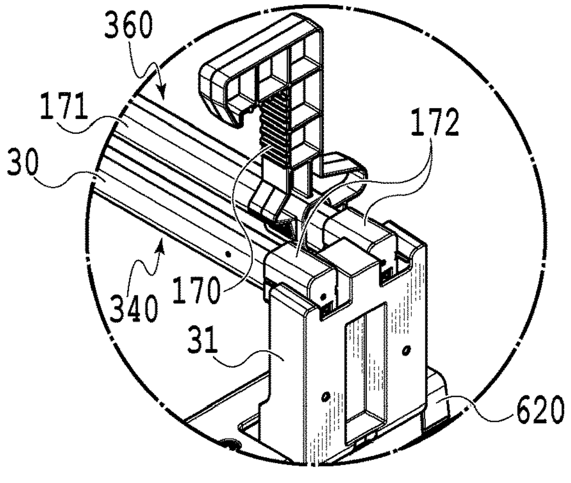

Embodiments of the present invention will be described below in detail with reference to the accompanying drawings. First, a schematic configuration of a printing apparatus 10 according to an embodiment of the present invention will be described with reference to FIGS. 1A, 1B, 2A, 2B, and 2C. FIG. 1A is a perspective view of the printing apparatus 10 and FIG. 1B is a right side view of the printing apparatus 10. Meanwhile, FIG. 2A is a perspective view of the printing apparatus 10 omitting a receiver 40, FIG. 2B is a front view of the printing apparatus 10 omitting the receiver 40, and FIG. 2C is a partially enlarged diagram of a portion indicated with a frame IIC in FIG. 2A.

The printing apparatus 10 shown in FIGS. 1A and 1B includes a body 1 of the printing apparatus 10, legs 2 that support the body 1, and a stacker 3 (a sheet storage device) installable at a predetermined position relative to the body 1. Specifically, in the printing apparatus 10, the stacker 3 is installed at the predetermined position relative to the body 1, whereby sheets discharged from the body 1 are continuously and surely stored in the stacker 3. In the following description, the predetermined position where the stacker 3 can continuously and surely store the sheets discharged from the body 1 will be referred to as a "storage position".

The body 1 includes roll sheet holders 160 and 161, each of which rotatably holds a roll sheet formed by winding an elongated sheet (a continuous sheet) around a paper tube. The roll sheet held by the roll sheet holders 160 and 161 is reeled out and fed as sheets to a printing unit 5 (to be described later) through a feeding mechanism (not shown) and the like. Meanwhile, the roll sheet holder 161 is located below the roll sheet holder 160. In other words, the roll sheet holders 160 and 161 are arranged in a vertical direction (in a gravitational direction). Here, the roll sheet holder 161 located below may have a function that enables the roll sheet holder 161 to reel in the sheet which is supplied from the roll sheet holder 160 and printed.

Moreover, the body 1 includes the printing unit 5 configured to perform printing on a conveyed sheet W, which is a printing medium reeled out of the roll sheet housed in each of the roll sheet holders 160 and 161 and is conveyed by a conveyance mechanism (not shown). Here, a cutter 6 is provided between the printing unit 5 and a discharge port 1*a* (to be described later), and each printed sheet is cut out by the cutter 6 at a predetermined position. Furthermore, the body 1 includes the discharge port 1*a* that discharges the printed sheet, and a discharge port guide 1*b* that guides the printed sheet to the outside of the body 1 through the discharge port 1*a*. The sheet being discharged by inches along with a printing operation passes through the discharge port guide 1*b*, and then changes its traveling direction downward due to its own weight, and then starts drooping down. Here, a guide surface 1*c* is provided below the discharge port guide 1*b*. The guide surface 1*c* is formed as part of a housing of the body 1 and designed to be capable of guiding the sheet discharged from the discharge port guide 1*b*. Accordingly, as the sheet discharged from the discharge port guide 1*b* droops down due to its own weight, a front end of the curled sheet comes into contact with the guide surface 1*c*. Then, the front end of the sheet is guided parallel with the guide surface 1*c* along with conveyance (discharge) of the sheet.

The roll sheet holders 160 and 161 are located below the discharge port 1*a* and the discharge port guide 1*b*. Moreover, in light of ease of operation for replacement of the roll sheets by a user and so forth, the two roll sheet holders 160 and 161 are provided substantially at a central position in a height direction of the printing apparatus 10.

The roll sheet holders 160 and 161 are provided on a front side of the printing apparatus 10 where the discharge port 1*a* is open. This enables the user to set a roll sheet on the roll sheet holder 160 provided in the inside from the front side of the printing apparatus 10 by opening the housing of the body 1 after moving the stacker 3 from the storage position, for example. In the meantime, this also enables the user to set a roll sheet on the roll sheet holder 161 from the front side of the printing apparatus 10. Thus, the user can conduct replacement work of the roll sheets from the front side without having to move the printing apparatus 10, and a burden on the user associated with this operation is reduced accordingly.

Moreover, the body 1 includes an operating unit 4. The user can input various commands such as sheet size specification and switching between online and offline statuses by operating various switches provided on the operating unit 4. Although this embodiment is described on the assumption of a two-stage roll sheet configuration provided with the two roll sheet holders, the present invention is not limited only to this configuration but is also applicable to a printing apparatus including three or more roll sheet holders. Here, if such a printing apparatus includes three or more roll sheet holders, then the printing apparatus is at least provided with the two roll sheet holders 160 and 161.

The stacker 3 is configured to store the sheet which is cut out by the cutter 6 after the printing. The stacker 3 includes a sheet-shaped receiver 40 made of a thin, flat, and flexible material such as a cloth and a plastic. One end portion in a y direction of this receiver 40 is held on a front rod unit 330, while another end portion thereof is held on a rear rod unit 340. In other words, the front rod unit 330 and the rear rod unit 340 extend in an x direction and function as holding members to hold the two end portions in the y direction of the receiver 40. To be more precise, in terms of the y direction, the front rod unit 330 holds the end portion of the receiver 40 on a downstream side in a sheet discharge direction viewed from the discharge port 1*a*, while the rear rod unit 340 holds the end portion of the receiver 40 on an upstream side in the discharge direction.

The front rod unit 330 extends in the x direction and two ends thereof are connected to two side rods 11, respectively, by using connecting members 12. The side rods 11 are held by side rod holding members 61. Each side rod holding member 61 is provided on the stacker 3 side. Meanwhile, an upper rod unit 350 is located between the front rod unit 330 and the rear rod unit 340 and is inserted into a hole pouch (not shown) that extends in the x direction on the receiver 40, thereby holding the receiver 40. This upper rod unit 350 is positioned relative to the stacker 3 (to be described later), and supports the receiver 40. In other words, the upper rod unit 350 is movable and functions as a support member that supports an intermediate part of the receiver 40.

In this specification, a width direction of a sheet will be referred to as the x direction while two other directions orthogonal to the x direction will be referred to as the y direction and a z direction, respectively, in order to facilitate the understanding. Meanwhile, the +x direction in terms of the x direction will be referred to as a right side, the −x direction therein will be referred to as a left side, the +y direction in terms of the y direction will be referred to as a rear side, the −y direction therein will be referred to as a front side, the +z direction in terms of the z direction will be referred to as an upper side, and the −z direction therein will be referred to as a lower side, respectively.

Figure 3A:
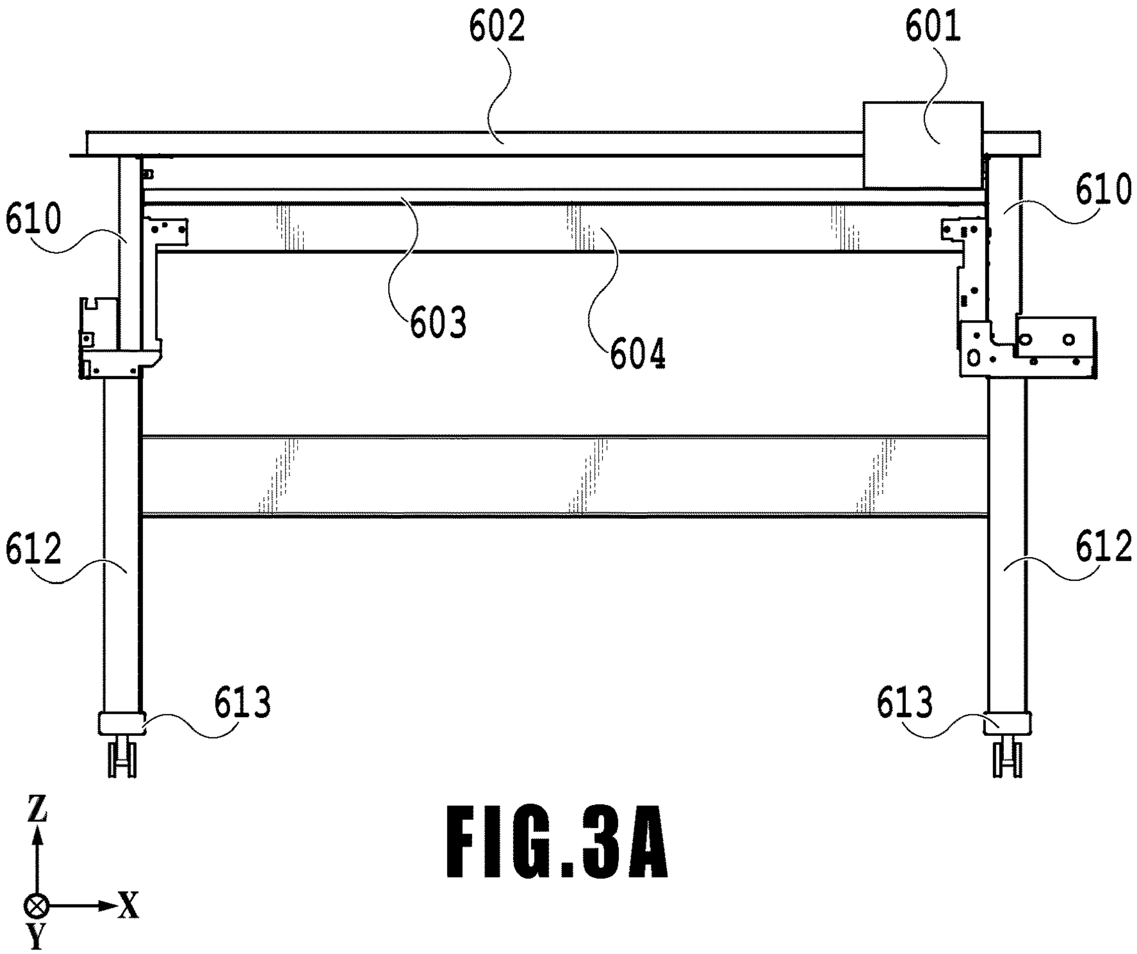
FIGS. 3A and 3B are explanatory diagrams showing frame structures for a body and for the stacker installed at a storage position.
Figure 3B:
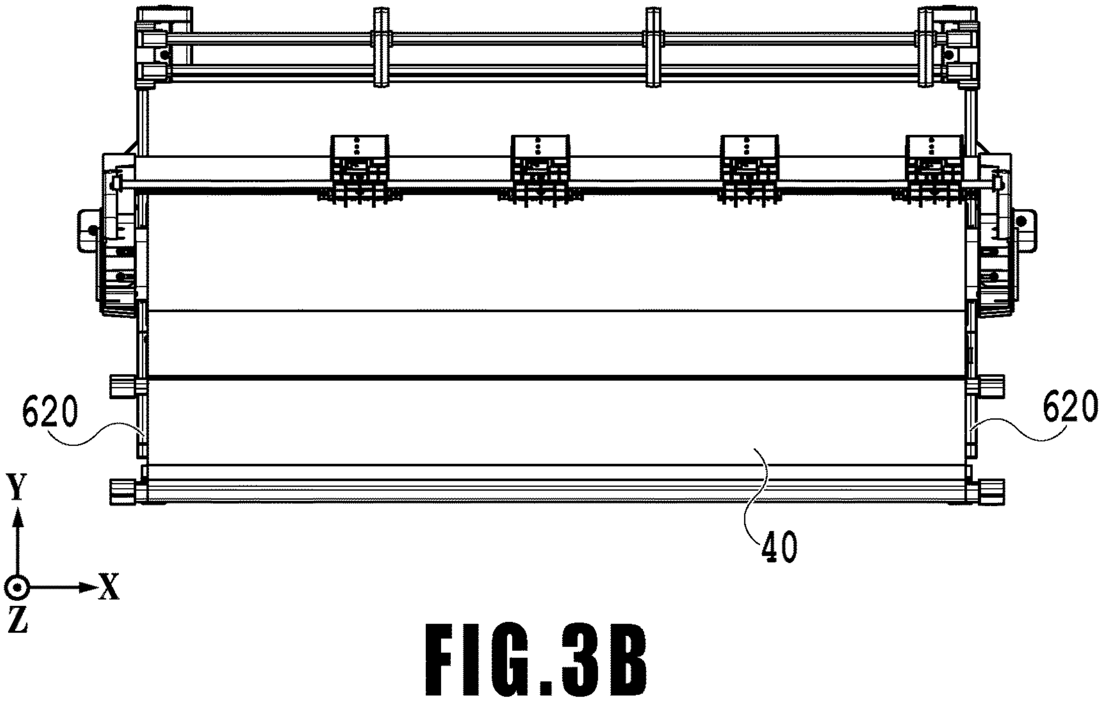

Here, a characteristic structure of the body 1 and a frame structure of the stacker 3 compatible therewith will be described by using FIGS. 3A and 3B. FIG. 3A is a partial front view of the body 1 and FIG. 3B is a plan view of the stacker 3. In a general printing apparatus, two outer ends of a main structure in a width direction of a sheet are supported from below by using two pillars. In particular, large format printing apparatuses which can print on large-sized sheets often have a size that exceeds 1 m in the sheet width direction and have a large weight at the same time. Accordingly, the structure configured to support the two outer ends of the main structure from below may cause a deflection of a printing unit including a print head and a platen, which are main components of the printing apparatus, or a deflection of a sheet conveyance unit, thus imposing an adverse effect on printing precision. To avoid this, the printing apparatus 10 adopts a configuration to use body legs 612 serving as pillars to support portions immediately below side supports 610, which support two side portions in the width direction (the x direction) of the printing unit and the conveyance unit that are of importance in positioning a main part of the frame structure inside the body 1. Thus, it is possible to suppress deformations of the side supports 610 and to suppress deflections of the printing unit and the conveyance unit associated therewith. The printing unit stated herein corresponds to a carriage 601 on which a printing head (not shown) is set for scanning in the width direction, and a carriage stay 602 that supports the carriage 601. Meanwhile, the conveyance unit corresponds to a conveyance roller (not shown), a platen 603 located below the carriage 601, and a platen stay 604 that supports the conveyance roller and the platen 603. In this embodiment, the printing unit and the conveyance unit are cited separately. In general, however, the printing unit and the conveyance unit may be collectively referred to as a printing unit.

As described above, as a consequence of adopting the configuration to support the portions immediately below the side supports 610 of the body 1 by using the body legs 612, the body legs 612 are located inward in the width direction as compared to the case of supporting the two outer ends of the main structure from the outside thereof. For this reason, a distance in the x direction between the two body legs 612 as well as between two body feet 613 that support the body legs 612 is reduced. In the meantime, reduction in installation area for the body 1 is a pressing issue to be solved to meet an expanding demand for large format printing apparatuses. Given the situation, the side supports 610 have to be located more inward (located closer to each other) so as to reduce the width of the body. As a consequence, the interval between the body legs 612 gets shorter. Since the stacker 3 is used while being installed at the storage position, each body foot 613 and a corresponding foot 620 of the stacker 3 are in a positional relationship in which each foot 620 moves and is always positioned at an inner side of the body foot 613 so as not to cause physical interference therebetween (see FIG. 2A). While legs are located at the center in the width direction of the feet in the case of a general stacker, legs 312 of the stacker 3 are not located immediately above the feet 620, but protrude outside in the width direction instead (see FIGS. 1A and 2A).

Meanwhile, a distance between the legs 312 and a distance between the feet 620 on the stacker 3 side also need to be shortened in conformity with the interval between the body legs 612 on the printing apparatus 10 side. In this way, it is possible to locate the receiver 40 above the feet 620 and to surely receive large-sized sheets. In the meantime, some cut sheets may tilt and fall onto the receiver 40. To deal with such a problem, the receiver 40 is preferably expanded to the outside of original sheet ends. Nonetheless, the role of the receiver 40 is to receive the sheets without dropping the sheets on the floor and the like. In this respect, the receiver 40 may be located between the two feet 620 without overlapping the feet 620 in the width direction, so that a space outside the receiver 40 and inside the legs 312 can also be considered as a receiver that is capable of receiving the sheets. In this way, the space inside the legs 312 and located below the body 1 can be used as a unit to store the sheets, so that dimensions not only in the width direction but also in a depth direction (the y direction) of the stacker 3 can be reduced.

Furthermore, it is preferable to use a space immediately below the body 1 also as a storage space in order to store large sheets in various modes. An example of such various reception modes includes face-down loading, in which a sheet is received while facing down a printed surface and then subsequent sheets are stacked thereon likewise. Unlike face-up loading in which a sheet is received while facing up a printed surface and then subsequent sheets are stacked thereon likewise, the face-down loading does not cause a curled front end of a subsequent sheet to catch a printed surface of a precedent sheet. Accordingly, the face-down loading has an advantage that it is unlikely to cause scratches on the printed surfaces. Moreover, the face-down loading stacks the sheets in such a way as to arrange the printed surfaces in accordance with the printed order, so that the user can save the trouble of rearranging the sheets in accordance with the printed order.

While this specification has explained the example in which no legs 312 are located immediately above feet 620, the legs 312 only need to be located at positions displaced from the center in the width direction of the feet 620. In this context, the legs 312 do not always have to protrude outside the feet 620.

In the meantime, such an advantage is also brought about by allowing each leg 312 to protrude in the width direction to a portion above a contact member 303 (to be described later), or by establishing a positional relationship in which the contact member 303 is not located ahead of the corresponding leg 312 in a front-back direction (the y direction) of the stacker 3. The legs 312 can keep the user from inadvertently coming into contact with the contact member 303, and prevent damage to the contact member 303 due to an unexpected load.

Meanwhile, as shown in FIGS. 2A and 2B, the stacker 3 includes multiple first sheet butting members 170. The first sheet butting members 170 are arranged in the x direction on a first sheet stopper unit 360, which is provided parallel to the rear rod unit 340. A rear rod 30 (to be described later) of the rear rod unit 340 and a stopper rod 171 (to be described later) of the first sheet stopper unit 360 are positioned by use of rod holding members 31, each provided in the vicinity of a rear end portion of the corresponding foot 620 as shown in FIG. 2C. Rod caps 172 are provided at two end portions of each of the rear rod 30 and the stopper rod 171. Thus, the rear rod 30 and the stopper rod 171 are made attachable to and detachable from the rod holding member 31 by using the rod caps 172. The first sheet butting members 170 constitute a first sheet butting unit that receives the discharged sheet while being guided by the receiver 40. Here, the first sheet butting members 170 are located on a back side (a rear side)

of the printing apparatus 10 as compared to a roll sheet holder 161, for example. Specifically, in the stacker 3, the storage unit that can store the sheets is formed in such a way as to include a region located below in a direction of gravity of the roll sheet holder 161. Thus, the printing apparatus 10 can use the space below the roll sheet holder 161 as part of the storage unit, and is hence formed compactly in the depth direction (the y direction).

Figure 4:
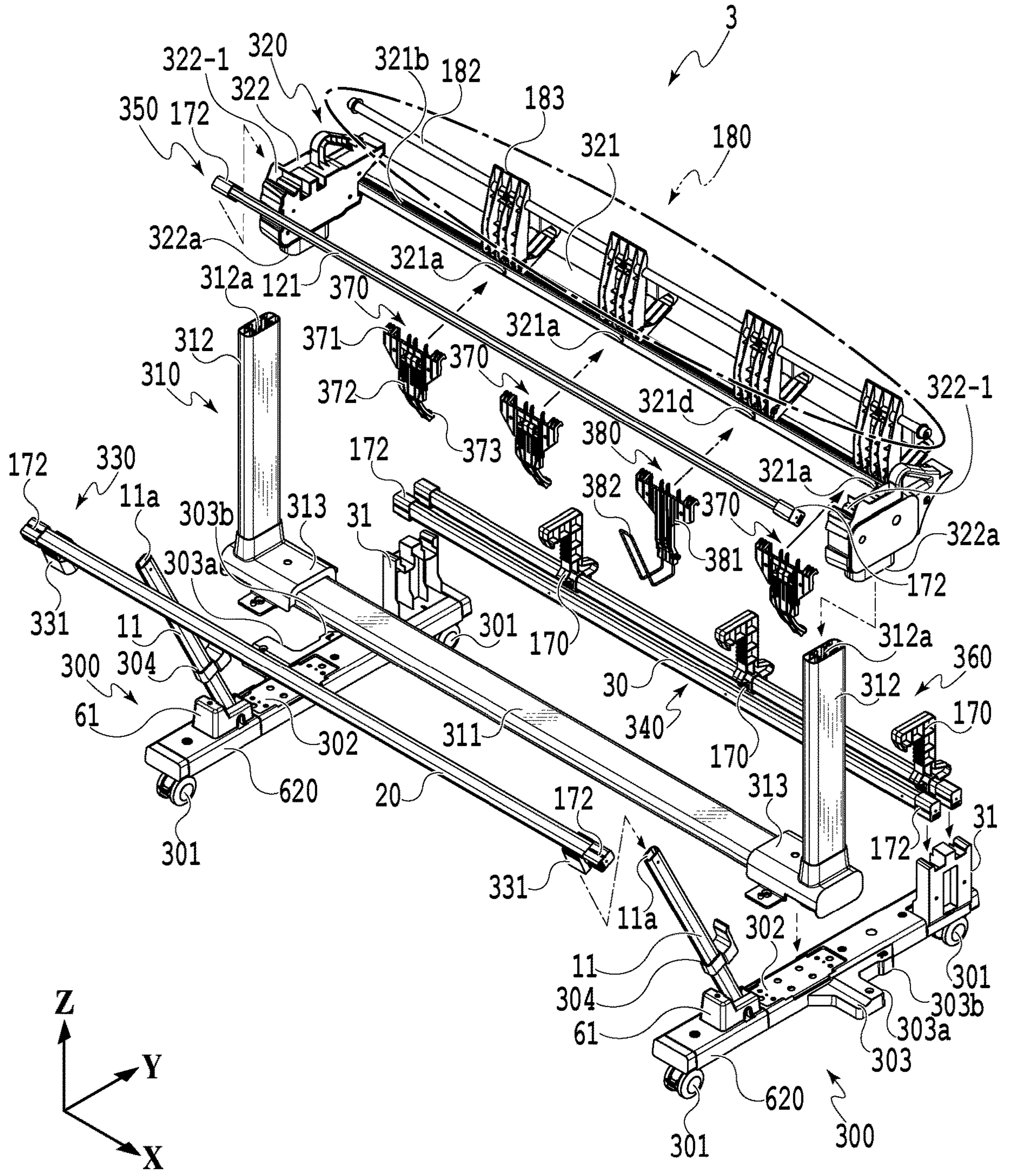
FIG. 4 is an exploded configuration diagram of the stacker.

Next, a configuration of the stacker 3 will be described in detail with reference to FIG. 4. FIG. 4 is an exploded configuration diagram of the stacker 3. Note that illustration of the receiver 40 is omitted in FIG. 4 in order to facilitate the understanding. Meanwhile, a chain dashed line in FIG. 4 illustrates a relation of engagement of components in the case of user setup. Units subjected to the user setup (inclusive of screw tightening) include: foot units 300; a stay leg unit 310; a back stay unit 320; the front rod unit 330, the rear rod unit 340, and the upper rod unit 350 which are provided for supporting the receiver 40; the first sheet stopper unit 360 provided with the first sheet butting members 170; multiple (three in this embodiment) roll guide units 370 attachable in the x direction; and a second sheet stopper unit 380. Note that although the three roll guide units 370 are provided in this embodiment, any of one, two, four, or more roll guide units 370 may be provided instead.

In each foot unit 300, a foot frame 302 is provided with a pair of right and left casters 301 that make the foot unit 300 movable in the x and y directions. Thus, the stacker 3 can come close to and move away from the body 1. Meanwhile, the foot frame 302 is provided with a contact member 303 that can come into contact with the body 1. The contact member 303 is configured to be capable of butting a contact portion 303*a* (which is a surface parallel to an x-z plane, for example) and a contact portion 303*b* (which is a surface parallel to a y-z plane, for example) against the body 1. Moreover, the foot frame 302 is provided with the side rod holding member 61 located forward of a position to fix the stay leg unit 310 and configured to rotatably support the corresponding side rod 11. In the meantime, the rod holding member 31 to hold the rear rod unit 340 and the first sheet stopper unit 360 is provided in the vicinity of a rear end portion of the foot frame 302. The two side rods 11 are provided with rod holders 304 for receiving the upper rod unit 350. The rod holders 304 are members used for placing the upper rod unit 350 as needed when changing a reception mode of the receiver 40 of the stacker 3.

The stay leg unit 310 includes a stay 311 extending in the x direction and two legs 312 extending in the z direction. Specifically, the stay leg unit 310 is integrated into a U-shaped configuration by connecting the stay 311 to the two legs 312 with not-illustrated components located on two ends in a longitudinal direction of the stay 311. Moreover, a cover 313 is provided so as to cover each connecting part between the stay 311 and the corresponding leg 312.

The back stay unit 320 includes a back stay 321 extending in the x direction and a guide flapper unit 180 (a portion surrounded by a dashed line in FIG. 4) provided on the back stay 321. Moreover, the back stay unit 320 includes two upper rod bases 322 provided at two ends in a longitudinal direction of the back stay 321. Here, the back stay unit 320 is designed such that the back stay 321 and the guide flapper unit 180 are located between the roll sheet holders 160 and 161 when the stacker 3 is installed at the storage position.

Regarding the three rod units to hold the receiver 40, the front rod unit 330 includes a front rod 20 extending in the x direction and rod caps 172 provided at two ends of the front rod 20. Moreover, the front rod unit 330 includes front rod supports 331 provided in the vicinity of the two ends of the front rod 20, respectively. The rear rod unit 340 includes the rear rod 30 extending in the x direction and rod caps 172 provided at two ends of the rear rod 30. The upper rod unit 350 includes an upper rod 121 extending in the x direction and rod caps 172 provided at two ends of the upper rod 121.

The first sheet stopper unit 360 includes the stopper rod 171 extending in the x direction and the multiple (three in this embodiment) first sheet butting members 170 provided in the x direction on the stopper rod 171. Moreover, the first sheet stopper unit 360 includes rod caps 172 provided at two ends of the stopper rod 171. Although this embodiment includes three first sheet butting members 170, any of one, two, four, or more first sheet butting members 170 may be provided instead.

Each roll guide unit 370 includes a first roll guide 371 and a second roll guide 372 rotatably provided to the first roll guide 371. Moreover, the roll guide unit 370 includes a roller 373 rotatably provided at a lower end portion of the second roll guide 372. The roll guide unit 370 is configured to be attachable to and detachable from the back stay 321. Multiple pieces (three in this embodiment) of the roll guide units 370 are provided in the x direction on the back stay 321.

The second sheet stopper unit 380 includes a second sheet butting member 381, and a wire tray 382 provided at a lower end portion of the second sheet butting member 381.

Meanwhile, when the user sets up the stacker 3, the user firstly puts an external part of the cover 313 of the stay leg unit 310 into engagement with an opening of any one of the right and left foot units 300 where the corresponding foot frame 302 is exposed. Thus, this foot unit 300 receives the weight of the stay leg unit 310 with a plane and easily stays upright by itself, thereby enabling the user to tighten screws and to assemble both the right and left foot units 300 by oneself. Next, the user inserts openings 322*a* of the right and left upper rod bases 322 of the back stay unit 320 into upper end portions 312*a* of the legs 312 (as indicated with a chain dashed line in FIG. 4), and the openings 322*a* and the upper end portions 312*a* are engaged with one another with screws.

Subsequently, regarding the front rod unit 330 among the three rod units to hold the receiver 40, the user inserts the front rod supports 331 located near the two ends of the front rod 20 into upper end portions 11*a* of the right and left side rods 11 (as indicated with another chain dashed line in FIG. 4), and the front rod supports 331 and the upper end portions 11*a* are engaged with one another with screws. Thus, the front rod unit 330 is fixed to the side rods 11. Meanwhile, regarding the rear rod unit 340, the user fits the rod caps 172 at the two ends of the rear rod 30 into concave portions in the right and left rod holding members 31. Thus, the rear rod unit 340 is fixed to the rod holding members 31. Moreover, regarding the upper rod unit 350, the user fits the rod caps 172 at the two ends of the upper rod 121 into fitting portions 322-1 of the upper rod bases 322 (as indicated with still another chain dashed line in FIG. 4). Thus, the upper rod unit 350 is fixed to the upper rod bases 322.

Figure 21:
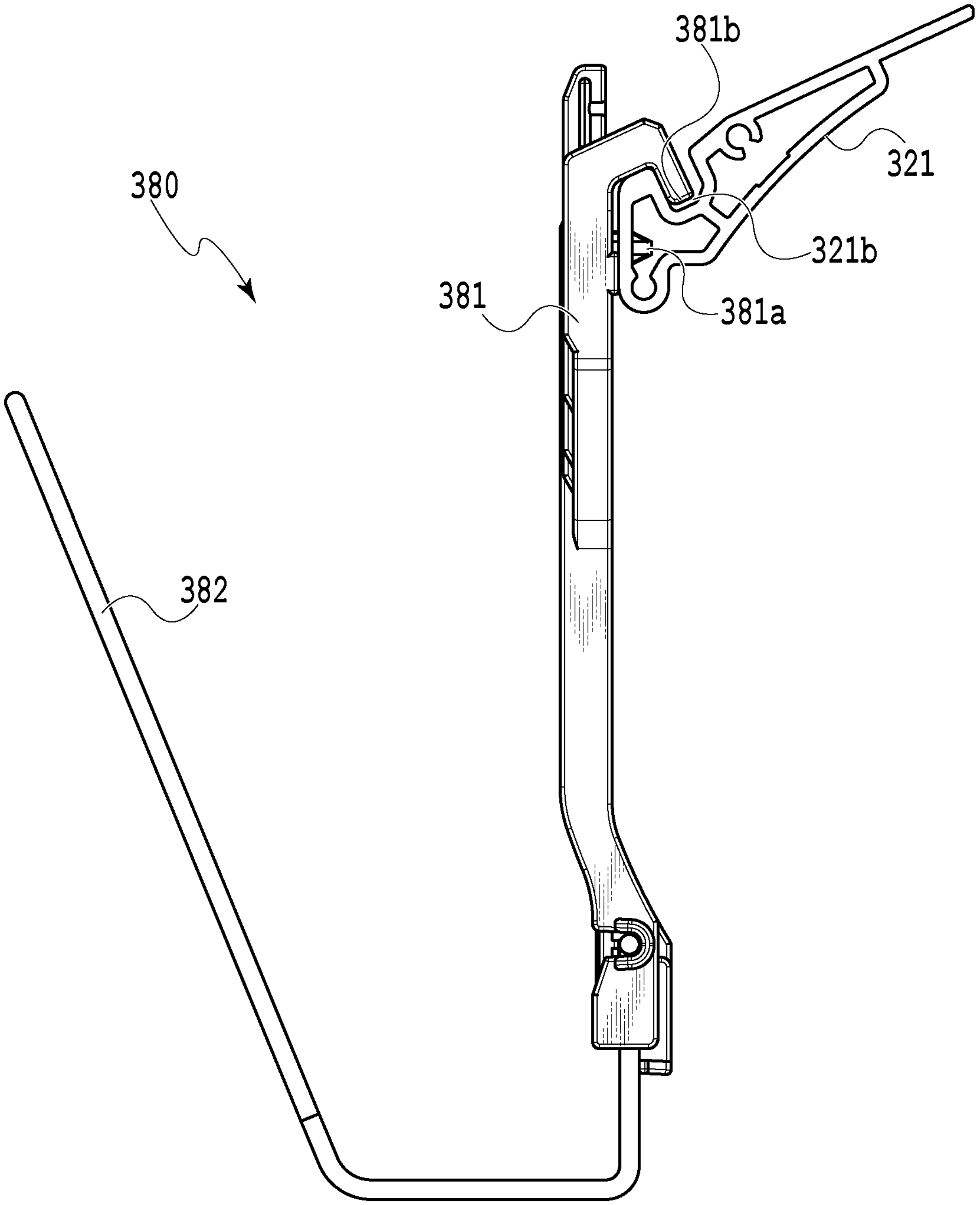
FIG. 21 is an explanatory diagram showing a state of attachment of a second sheet stopper unit.

Regarding the first sheet stopper unit 360, the user fits the rod caps 172 at the two ends of the stopper rod 171 into concave portions in the right and left rod holding members 31. Thus, the stopper rod 171 is fixed to the rod holding members 31 and located behind the rear rod 30. Regarding each roll guide unit 370, the user inserts a projection (not shown) into a hole portion 321*a* of the back stay 321 while catching a lock part (not shown) of the first roll guide 371 with a groove portion 321*b* of the back stay 321. Thus, the roll guide unit 370 is positioned and locked with the back stay 321. Regarding the second sheet stopper unit 380, a lock part 381*b* of the second sheet butting member 381 is caught with the groove portion 321*b* of the back stay 321 as shown in FIG. 21. Then, the user inserts a pin 381*a* into a hole portion 321*c* of the back stay 321, thereby positioning the second sheet stopper unit 380. Thus, the second sheet stopper unit 380 is locked with the back stay 321. Here, pins on the roll guide unit 370 and on the second sheet stopper unit 380, which are to be inserted into hole portions 321*a* and 321*d* of the back stay 321, respectively, are located at different positions in the x direction so as to avoid erroneous attachment. In the meantime, the wire tray 382 is rotatably provided to the second sheet butting member 381.

Figure 5B:
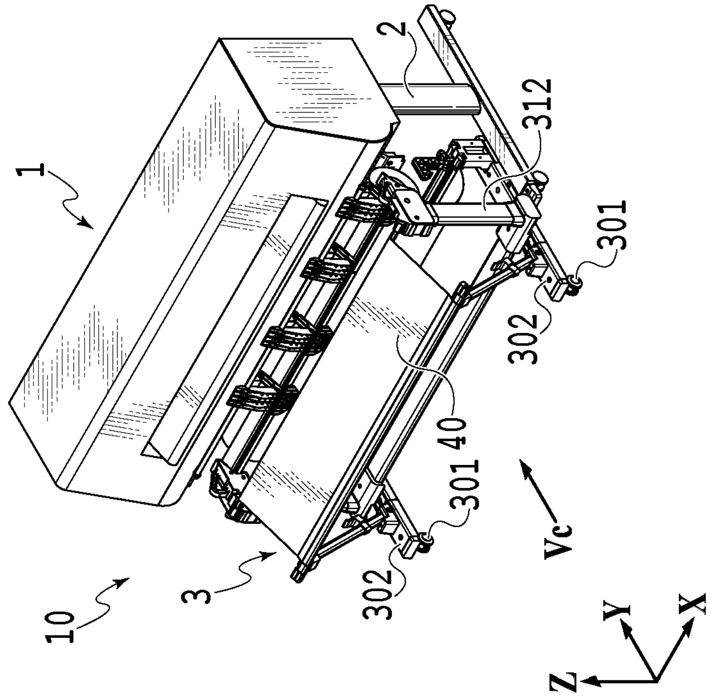
FIGS. 5A, 5B, and 5C are explanatory diagrams for explaining installation of the stacker at the storage position.
Figure 5C:
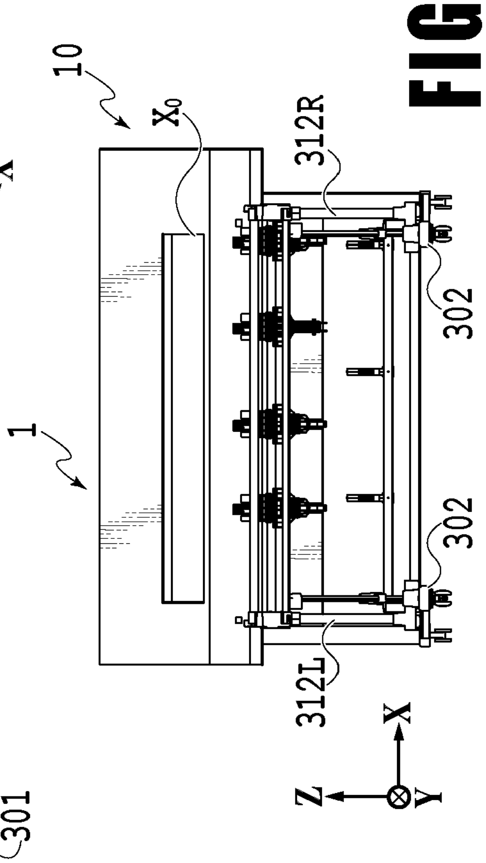
Figure 5A:
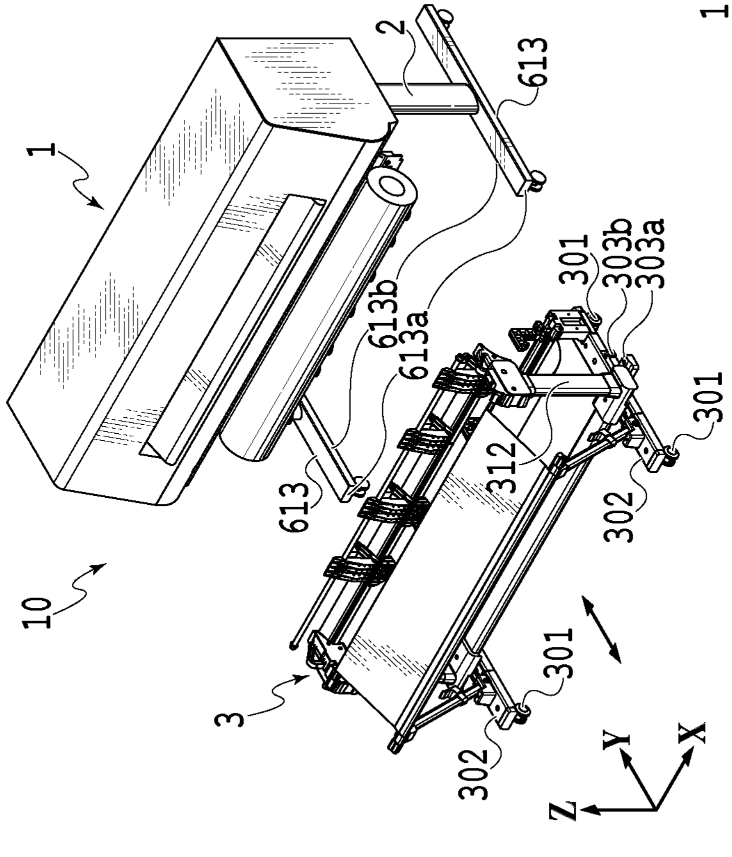

The stacker 3 in use needs to be moved to the storage position. Now, installation of the stacker 3 at the storage position relative to the body 1 will be described with reference to FIGS. 5A, 5B, and 5C. FIG. 5A is a perspective view showing a state where the stacker 3 is not installed at the storage position relative to the body 1, FIG. 5B is a perspective view showing a state where the stacker 3 is installed at the storage position relative to the body 1, and FIG. 5C is a view from a direction of an arrow Vc in FIG. 5B omitting the receiver 40.

The user moves the stacker 3 which is located at position away from the body 1 as shown in FIG. 5A, and brings the contact portions 303*a* of the right and left contact members 303 into contact with front surfaces 613*a* of the body feet 613. Meanwhile, a distance between the two contact portions 303*b* of the right and left contact members 303 is shorter than a distance between two inner side surfaces 613*b* of the body feet 613. Thus, the stacker 3 can move by a predetermined amount in the x direction at the storage position. The legs 312 are located outside the foot frames 302 in consideration of the amount of movement in the x direction. The following is an example applicable to a case where a sheet end reference position Xo is located on a right end portion of a discharge port 1*a*. Specifically, a leg 312R (see FIG. 5C) on the right side is located outside (on the right side of) the corresponding foot frame 302 such that the leg 312R is always positioned outside (on the right side of) the sheet end reference position Xo even when the stacker 3 at the storage position is moved in the x direction. By applying this configuration, the leg 312R is kept from being positioned inside (on the left side of) the sheet end reference position Xo even when the stacker 3 at the storage position is moved in the x direction. Here, a leg 312L on the left side does not always have to be located outside (on the left side of) of the corresponding foot frame 302. In other words, the leg 312L may be located immediately above or inside (on the right side of) the foot frame 302 as long as the leg 312L is positioned outside (on the left side of) a left end portion of the discharged sheet.

The configuration to locate the leg 312 outside in terms of the sheet width at the storage position as described above makes it possible to effectively use the space below the body 1, and to downsize the printing apparatus 10 in the depth direction (the y direction) even in the case of storing large-sized sheets. Moreover, the use of a space on a lower side of the stacker 3 provided separately from the printing apparatus 10 makes it possible to stack the sheets in the printed order, thereby enabling the face-down loading that is less likely to cause scratches on the printed surfaces.

Figure 6A:
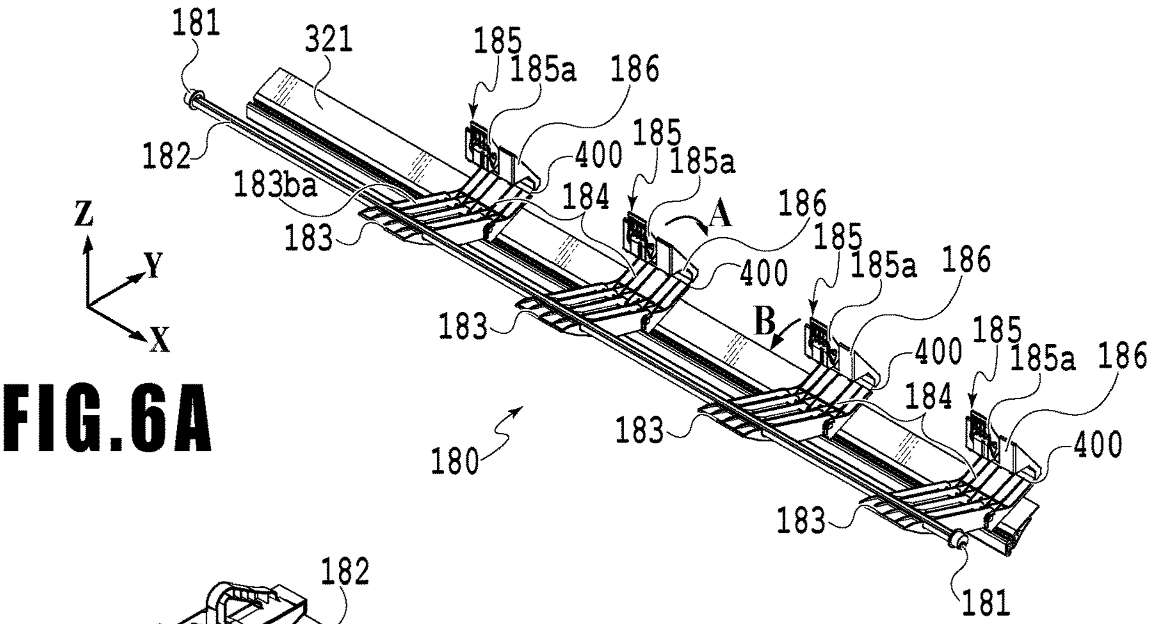
FIGS. 6A, 6B, and 6C are schematic configuration diagrams of a guide flapper unit in a state where flappers are open.
Figure 6B:
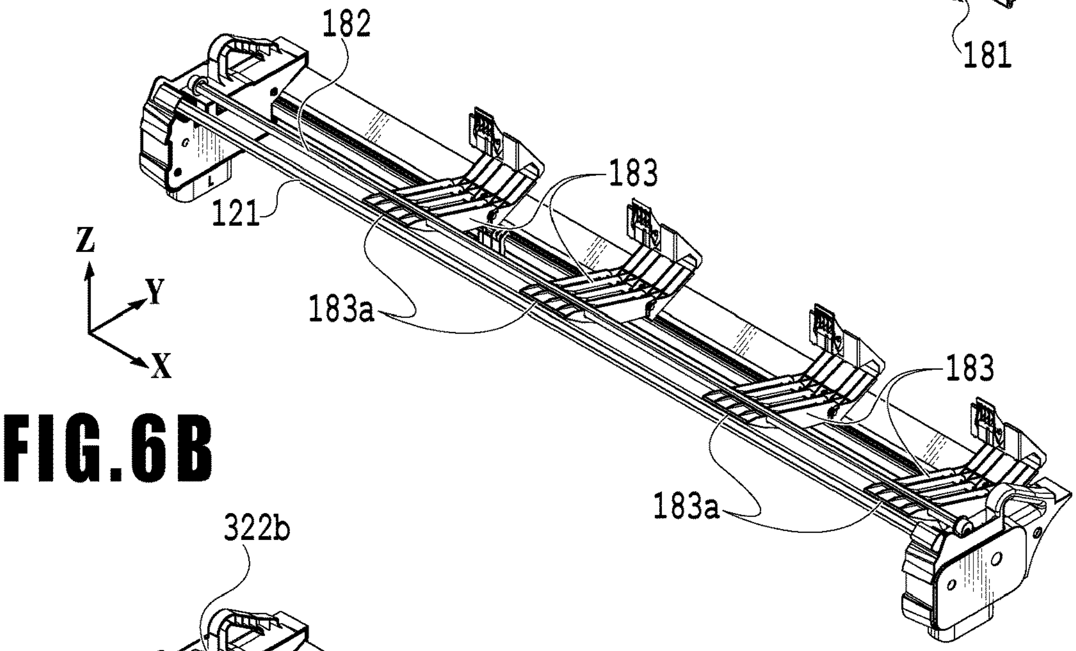
Figure 6C:
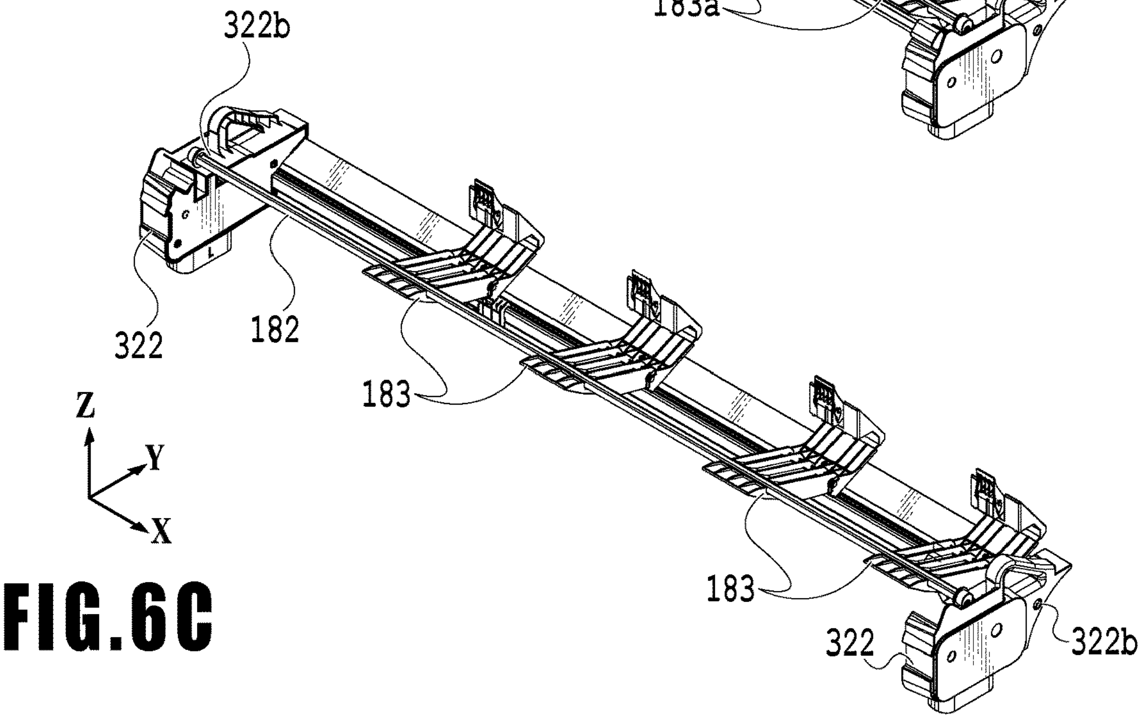
Figure 7A:
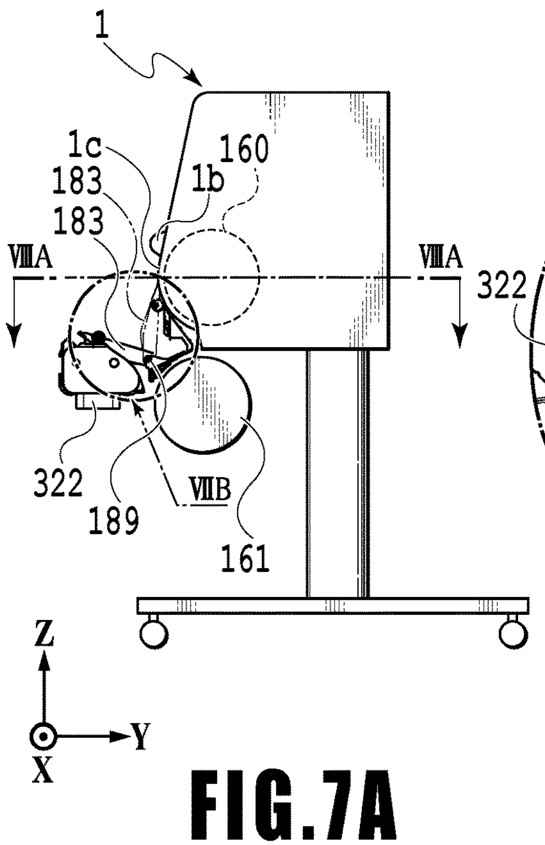
FIGS. 7A, 7B, 7C, and 7D are explanatory diagrams for explaining an operation and a configuration of each flapper.
Figure 7B:
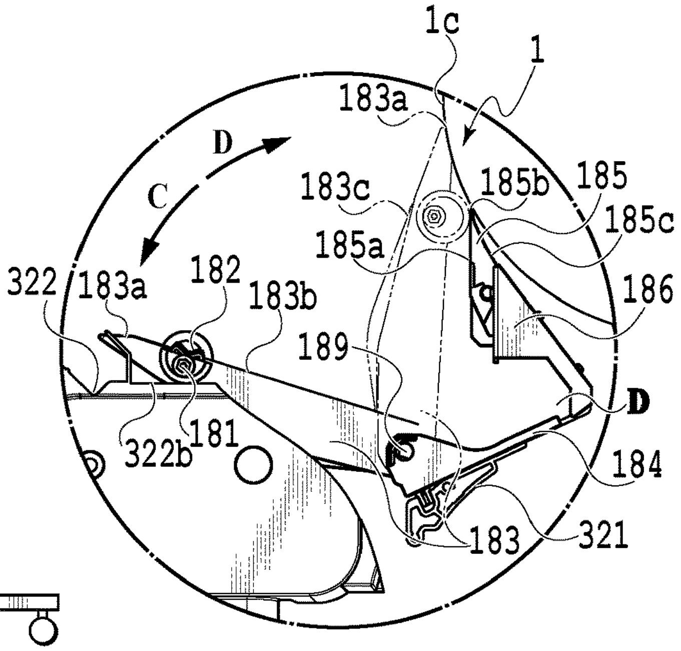
Figure 7C:
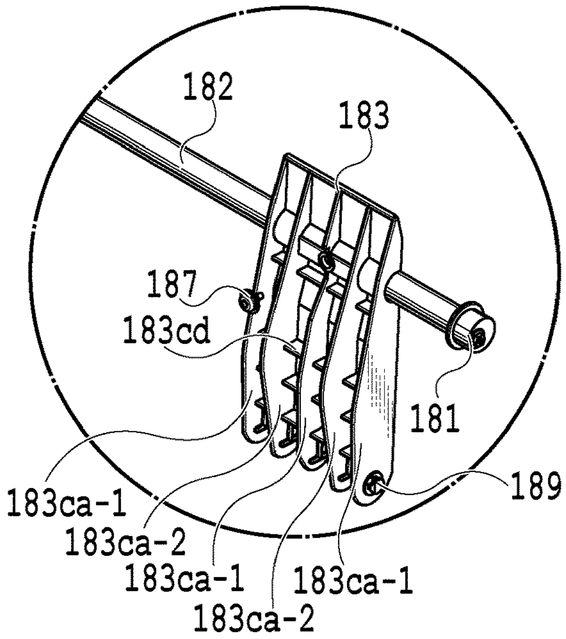
Figure 7D:
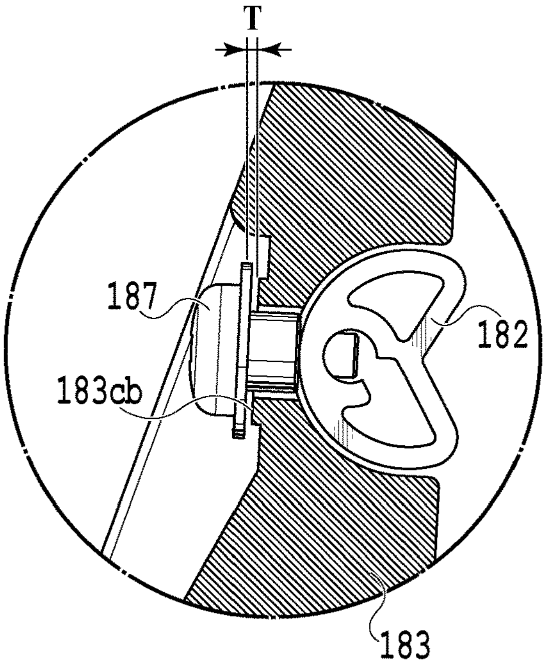
Figure 8A:
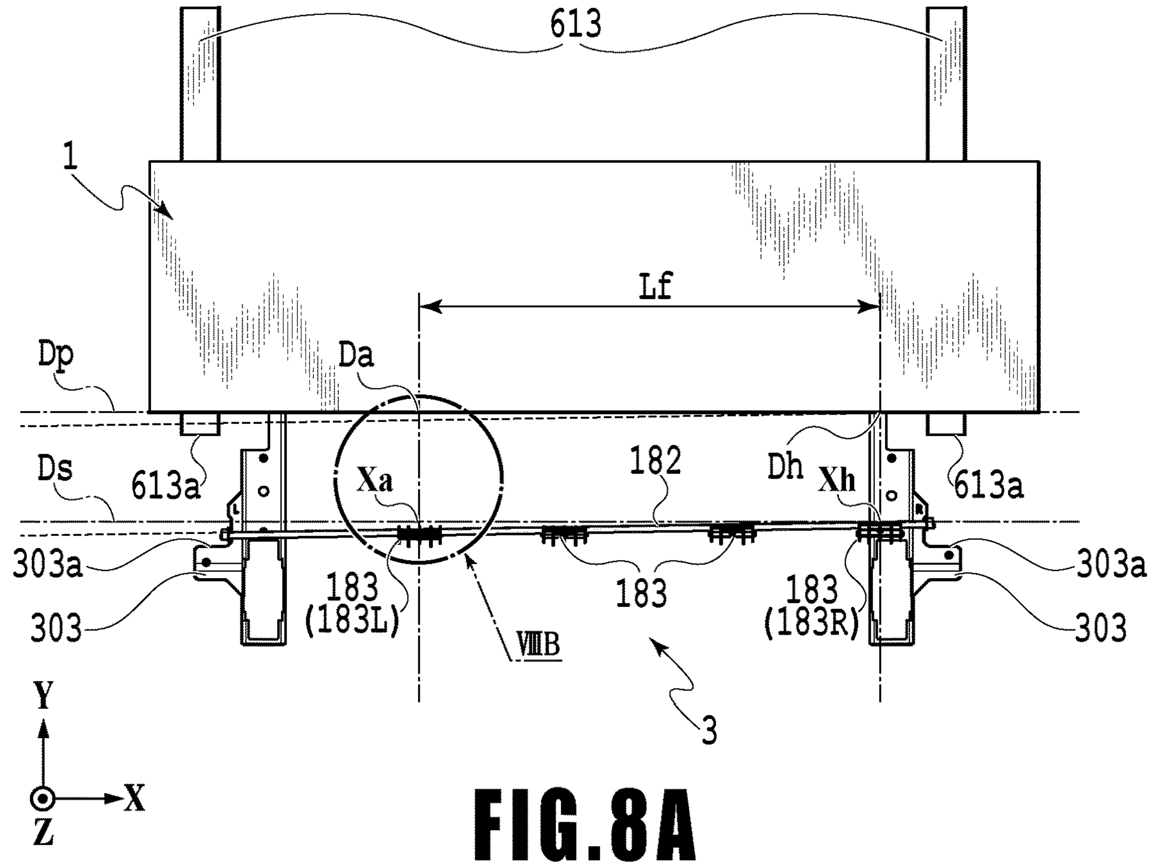
FIGS. 8A and 8B are explanatory diagrams for explaining a displacement amount of each flapper.
Figure 8B:
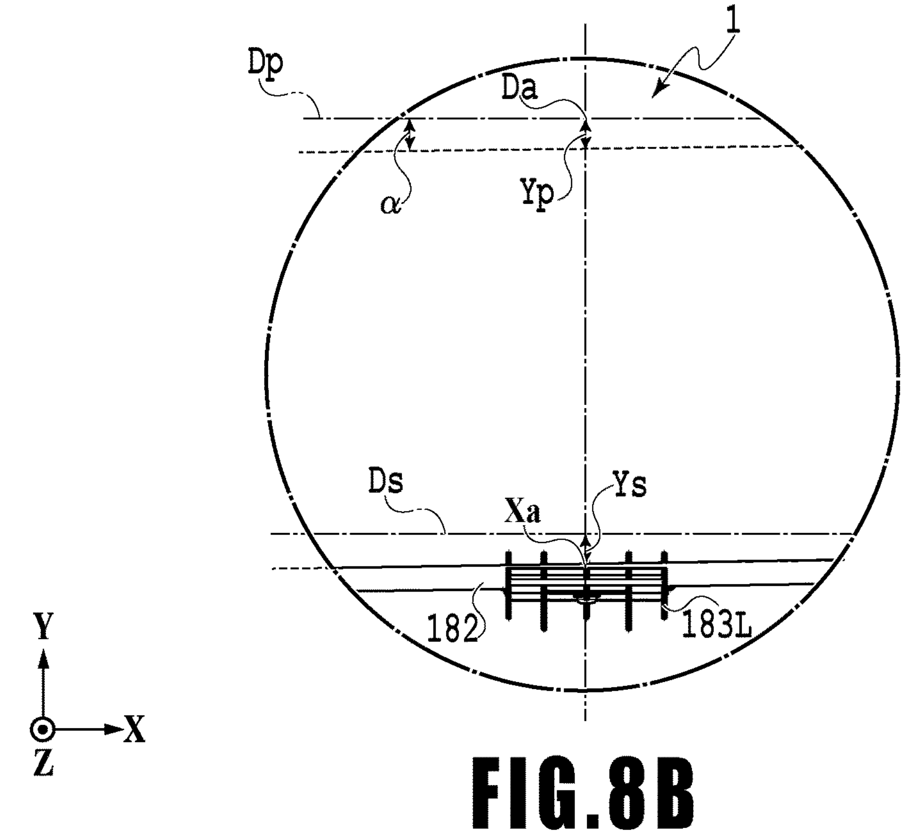

Next, the guide flapper unit 180 will be described in detail with reference to FIGS. 6A, 6B, 6C, 7A, 7B, 7C, 7D, 8A, and 8B. FIG. 6A is a perspective view of the guide flapper unit 180 attached to the back stay 321. FIGS. 6B and 6C are perspective views showing flappers 183 in an open state provided on the back stay unit 320. FIG. 7A is a right side view of the printing apparatus 10. FIG. 7B is a partially enlarged diagram of a frame VIIB in FIG. 7A. FIGS. 7C and 7D are explanatory diagrams showing a configuration to attach each flapper 183 to a guide rod 182. FIG. 8A is a cross-sectional view taken along the VIIIA-VIIIA line in FIG. 7A. FIG. 8B is a partially enlarged diagram of a frame VIIIB in FIG. 8A. Note that in FIGS. 7A and 8A, illustration of components not necessary for the description with reference to these drawings is omitted in order to facilitate the understanding. Moreover, the upper rod base 322 is partially cut away in FIG. 7A.

As shown in FIG. 6A, the guide flapper unit 180 includes the multiple (four in this embodiment) flappers 183, multiple guides 184 to which the flappers 183 are openably and closably attached, and the guide rod 182 which holds the multiple flappers 183. Moreover, the guide flapper unit 180 includes sheet guides 185, which are rotatably provided to corresponding sheet guide holders 186 and are capable of guiding the discharged sheet in the state where the flappers 183 are open. Cap members 181 are attached to two ends of the guide rod 182 (a connecting unit or a second rod) so as to avoid direct contact with the user. In the meantime, each guide 184 is formed integrally with the corresponding sheet guide holder 186 through the intermediary of a guide plate 400, and a concave portion D (see FIG. 7B) that is open forward, leftward, and rightward is formed by the guide 184, the sheet guide holder 186, and the guide plate 400. Each sheet guide 185 is rotatably provided to the corresponding sheet guide holder 186 so that a guide surface 185*a* can face a front side. Moreover, the sheet guide 185 is always biased in a direction of an arrow A with a biasing member (not shown) such as a torsion coil spring provided to the sheet guide holder 186. When the stacker 3 is installed at the storage position, a front end portion 185*b* (or a back surface 185*c*) of the sheet guide 185 is brought into contact with the guide surface 1*c* of the body 1 as shown in FIG. 7B. At this time, the sheet guide 185 is rotated in a direction of an arrow B against the biasing force in the direction of the arrow A by the biasing member, and is brought into contact with the body 1. Here, a position of contact of the front end portion 185*b* with the body 1 may be any position as long as the front end portion 185*b* can guide a front end of the sheet at that position, and the position is not limited only to the guide surface 1*c*.

The flappers 183, the guides 184, the sheet guides 185, and the sheet guide holders 186 are attached onto the back stay 321 through the intermediary of the guide plates 400. Specifically, in the printing apparatus 10, the flappers 183, the guides 184, the sheet guides 185, the sheet guide holders 186, the guide plates 400, and the like constitute a reception member to receive the discharged sheet. Although this embodiment provides the four reception members, the present invention is not limited to this configuration and any of one, two, three, five, or more reception members may be provided instead. Meanwhile, at a front end of the discharged sheet, an end portion in the width direction (the x direction) of the sheet is strongly curled. For this reason, it is preferable to provide the reception members at least at positions corresponding to two end portions in the width direction of the sheet that is assumed to be used.

Here, the contact members 303 are brought into contact with the body feet 613 when the stacker 3 is installed at the storage position. In other words, the stacker 3 is installed at the storage position based on the contact members 303. At this time, a route (a path) for the discharged sheet is formed on the body 1 side and the stacker 3 side at a location above and away from the contact members 303. To be more precise, the path for the sheet is formed by bringing the flappers 183 and the sheet guides 185 into contact with the body 1 (the guide surface 1*c*).

Here, each sheet guide 185 and a contact portion of the body 1 with the sheet guide 185 are made of a resin material and have a predetermined length in the x direction. For this reason, when the sheet guide 185 is fixed, the sheet guide 185 may run into the guide surface 1*c* due to component tolerances and the like if the user thrusts the stacker 3 into the body 1 with a great force, whereby the sheet guide 185 or the body 1 may be damaged. However, in the printing apparatus 10, the sheet guide 185 is rotatably provided to the sheet guide holder 186. Accordingly, the printing apparatus 10 can absorb component tolerances and assembly errors, and suppress damage on the sheet guide 185 and the body 1. In the meantime, the installation at the storage position is achieved by using understructures of the feet 620 and the body feet 613. In this way, even if the user thrusts the stacker 3 into the body 1 with a great force, a load will be received by the robust understructures and the sheet guide 185 and the body 1 will be hardly damaged.

Each flapper 183 is provided to the guide 184 in such a way as to be rotatable about a rotating center 189. Meanwhile, the flapper 183 includes a support surface (a second surface) 183*b* which can support a front end portion (a region having a predetermined length from the front end) of the sheet discharged from the discharge port 1*a*, and a guide surface (a first surface) 183*c* which can guide the front end of the sheet downward. Note that the support surface 183*b* and the guide surface 183*c* are surfaces of the flapper 183, which are located opposite from each other. Moreover, the support surface 183*b* is formed from ribs 183*ba* (see FIG. 6A) which extend in a direction of movement of the sheet when supporting the sheet. Meanwhile, as shown in FIG. 7C, the guide surface 183*c* of the flapper 183 is provided with multiple ribs 183*ca*-1 and 183*ca*-2 which extend in the direction of movement of the sheet when guiding the sheet. The ribs 183*ca*-2 are formed higher than the ribs 183*ca*-1. As a consequence, the sheet to be guided by the guide surface 183*c* mainly comes into contact with the ribs 183*ca*-2. In other words, the guide surface 183*c* is formed from the multiple ribs 183*ca*-2.

In this specification, a state (a state indicated with a solid line in FIG. 7B) where the concave portion D is open and the flapper 183 is located at a position where the flapper 183 can support the front end portion of the discharged sheet by using the support surface 183*b* will be referred to as a state where the flapper 183 is open. Note that the state where the flapper 183 is open will also be referred to as a supportive posture (a second posture). On the other hand, in this specification, a state (a state indicated with a dashed line in FIG. 7B) where the concave portion D is covered with the flapper 183 and the flapper 183 is located at a position where the flapper 183 can guide the front end portion of the discharged sheet by using the guide surface 183*c* will be referred to as a state where the flapper 183 is closed. Note that the state where the flapper 183 is closed will also be referred to as a guiding posture (a first posture). Here, in the state where the flapper 183 is closed, a front end portion 183*a* of the flapper 183 which is located away from the rotating center 189 comes into contact with the guide surface 1*c* of the body 1 located above the rotating center 189. On the other hand, in the state where the flapper 183 is open, the support surface 183*b* is formed into an upgrade toward the front end portion 183*a*. In other words, in the course of the rotating of the flapper 183 about the rotating center 189, the front end portion 183*a* is always located above the rotating center 189.

As shown in FIG. 6A, the multiple guides 184 provided with the flappers 183, respectively, are arranged in the x direction and on the back stay 321 that extends in the x direction. Moreover, as shown in FIG. 7B, each flapper 183 provided to the corresponding guide 184 is made openable and closable while being rotated in directions of arrows C and D.

In the state where the flapper 183 is rotated in the direction of the arrow C and the flapper 183 is open, the sheet guide 185 and the concave portion D are opened. In the stacker 3 installed at the storage position, the front end portion 185*b* of the sheet guide 185 is in contact with the body 1. This is because each sheet guide 185 is biased toward the body 1 by the biasing member and is therefore capable of independently coming into contact with the body 1. Thus, the sheet guide 185 can play a role as the guide for delivering the front end of the discharged sheet from the body 1 side to the guide 184 side. Here in the state where the flapper 183 is open, the front end portion 183*a* (the guide surface 183*c* side) of the flapper 183 is in contact with the upper rod unit 350 (a first rod) and is supported by the upper rod unit 350. Here, in the upper rod unit 350, the upper rod 121 is inserted into the hole pouch on the receiver 40. For this reason, in a strict sense, the front end portion 183*a* is supported by the upper rod unit 350 through the receiver 40 in the state where the flapper 183 is open. Here, the front end portion 183*a* means a predetermined portion in the vicinity of the front end which is inclusive of the front end of the flapper 183. On the other hand, in the state where the flapper 183 is rotated in the direction of the arrow D and the flapper 183 is closed, the front end portion 183*a* (the support surface 183*b* side) of the flapper 183 is in contact with the guide surface 1*c* of the body 1 and is supported by the guide surface 1*c* (first and second reception modes to be described later). In this state, the flapper 183 plays a role as the guide for the front end of the sheet.

Accordingly, in order to surely bring the front end portion 183*a* of each of the flappers 183 into contact with the body 1, the flappers 183 are attached to the guide rod 182 as shown in FIGS. 7C and 7D. Here, the guide rod 182 is designed to be attached near the front end portion 183*a* of each flapper 183. To be more precise, when the guide rod 182 located on the support surface 183*b* side is fixed from the guide surface 183*c* side by using a screw 187, a clearance T is provided between a head of the screw 187 and an opening plane 183*cb* on the guide surface 183*c* side of a hole into which the screw 187 is inserted. A stepped screw or the like is used for the screw 187. Thus, the flapper 183 is fixed to the guide rod 182 while retaining a certain degree of freedom so as to be movable within a predetermined range. In other words, the flapper 183 is fixed to the guide rod 182 while retaining a backlash. By retaining the backlash as mentioned above, the front end portion 183*a* can follow the guide surface 1*c* of the body 1 by its own weight in the state where the flapper 183 is closed. To put it another way, the front end portion 183*a* can surely be brought into contact with the guide surface 1*c* across the width direction of the flapper 183. Thus, it is possible to prevent the front end of the discharged sheet from entering a gap between the front end portion 183*a* and the body 1.

Although the front end portion 183*a* (the guide surface 183*c* side) is supported by the upper rod unit 350 in the state where the flapper 183 is open, the present invention is not limited only to this configuration. Specifically, a space may be provided between the front end portion 183*a* and the upper rod unit 350 in the state where the flapper 183 is open, and the front end portion 183*a* may be supported by the upper rod unit 350 when the flapper 183 is deformed downward due to the weight of the stacked sheets.

Meanwhile, the stacker 3 changes a reception mode for the sheet discharged from the discharge port 1*a* by opening and closing the flappers 183. In other words, the flappers 183 have different functions and effects depending on whether the flappers 183 are in the open state or the closed state. In the closed state (the first and second reception modes to be described later), each flapper 183 guides the front end of the sheet as previously mentioned. Meanwhile, in the open state, the support surface 183*b* supports the front end portion of the sheet. Here, in the state where the flapper 183 is open, the front end portion 183*a* can come into contact with the upper rod unit 350 through the receiver 40 as shown in FIG. 6B, for example (a third reception mode to be described later). The flapper 183 is fixed to the guide rod 182 while retaining the backlash. Accordingly, when the flapper 183 comes into contact with the upper rod unit 350, component tolerances and assembly errors are absorbed and the front end portion 183*a* follows the upper rod unit 350. In other words, the front end portion 183*a* of the flapper 183 can be surely brought into contact with the upper rod unit 350 across the width direction of the flapper 183.

In case of a configuration that cannot absorb component tolerances or assembly errors, the front end portion 183*a* comes into partial contact with the upper rod unit 350. If a lot of sheets are stacked on the flapper 183 in this state, an unexpected load on the flapper 183 may be generated and the flapper 183 may be damaged. On the other hand, the stacker 3 of this embodiment is configured to absorb component tolerances and assembly errors as mentioned above, and the front end portion 183*a* surely comes into contact with the upper rod unit 350 across the width direction thereof. For this reason, even if a lot of sheets are stacked on the flapper 183, it is possible to secure a load bearing property of the flapper 183 and to prevent damage of the flapper 183.

Meanwhile, in the state where the flapper 183 is open, the guide rod 182 can be brought into contact with flat surface portions 322*b* of the upper rod bases 322 as shown in FIG. 6C, for example (a fourth reception mode to be described later). That is to say, each upper rod base 322 functions as a supporting unit to support the guide rod 182. At this time, the flapper 183 is hanging down from the guide rod 182 due to its own weight because the upper rod unit 350 is not attached to the upper rod base 322. Accordingly, the guide rod 182 is protruding from the support surface 183*b*, so that the discharged sheet can be surely received by the guide rod 182 that is uniform and continuous in the width direction of the sheet. It is therefore possible to prevent development of a state where it is not possible to continuously receive the sheets as a certain sheet falls into a space between the adjacent flappers 183, or of a state of a reception failure (a sheet discharge failure) due to a folded sheet and the like.

Here, the support surface 183*b* of the flapper 183 is formed from the ribs 183*ba* while the guide surface 183*c* thereof is formed from the ribs 183*ca*-2. In this way, friction resistance between the sheet and the support surface 183*b* as well as the guide surface 183*c* can be reduced. Furthermore, the weight of the flapper 183 can also be reduced. As a consequence, it is possible to manipulate the flapper 183 with a smaller force.

Here, as shown in FIGS. 7A and 7B, the rotating center 189 of the guide 184 in the flapper 183 is provided below the flapper 183 in a direction of gravity. Then, by use of the rotating center 189, the front end portion 183*a* comes into contact with the guide surface 1*c* of the body 1 when the flapper 183 is in the closed state, while the front end portion 183*a* is detached from the guide surface 1*c* when the flapper 183 is in the open state. In the meantime, when the stacker 3 is installed at the storage position, the rotating center 189 is located below a rotating center of the roll sheet in the roll sheet holder 160 and above a rotating center of the roll sheet in the roll sheet holder 161. Meanwhile, when the stacker 3 is installed at the storage position, the guide flapper unit 180 is located between the roll sheet holders 160 and 161. Accordingly, in the printing apparatus 10, the discharge port 1*a*, the rotating center of the roll sheet in the roll sheet holder 160, the rotating center 189 of the flapper 183, and the rotating center of the roll sheet in the roll sheet holder 161 are arranged in this order in terms of the direction of gravity. In other words, the discharge port 1*a*, the rotating center of the roll sheet in the roll sheet holder 160, the rotating center 189 of the flapper 183, and the rotating center of the roll sheet in the roll sheet holder 161 are arranged in this order from above downward. Furthermore, the rotating center 189 is located anterior to the front end portion 183*a* when the flapper 183 is in the closed state. In other words, when the flapper 183 is in the closed state, the front end portion 183*a* is located closer to the body 1 than the rotating center 189 is. This configuration makes it possible to maintain a state of contact between the front end portion 183*a* and the guide surface 1*c* of the body 1 without using the biasing force of the spring or the like in order to bring the front end portion 183*a* into contact with the guide surface 1*c*. Specifically, when the flapper 183 comes into contact with the guide surface 1*c*, the center of gravity of the flapper 183 is located on the body 1 side (the guide surface side) by the weight of the flapper 183 and of the guide rod 182, and the state of contact between the flapper 183 and the guide surface 1*c* is thus maintained. Accordingly, it is possible to configure the guide flapper unit 180 simply.

Note that when the guide surface 1*c* comes into contact with the front end portion 183*a*, the flapper 183 is configured to follow the guide surface 1*c* as mentioned previously. For example, a center position in the width direction of a flapper 183R on the sheet end reference position Xo side (the rightmost side) in the x direction is defined as Xh and a center position in the width direction of a flapper 183L located on the opposite side of the sheet end reference position Xo (the leftmost side) in the x direction is defined as Xa. Meanwhile, a distance between the center position Xh and the center position Xa is defined as Lf. Moreover, when the stacker 3 is installed at the storage position as shown in FIGS. 8A and 8B, a straight line Dp is assumed to be tilted by an angle α with respect to the x direction due to a component tolerance or an assembly error. Here, the straight line Dp is a straight line connecting between a point Dh where the center position Xh is located when the flapper 183R comes into contact with the guide surface 1*c* and a point Da where the center position Xa is located when the flapper 183L comes into contact with the guide surface 1*c*.

In this case, a position of contact of the flapper 183L with the body 1 at the center position Xa is displaced in the +Y direction, and a displacement amount Yp in this case is expressed by the following formula:

$$Yp = Lf \times \tan\alpha.$$

Note that each flapper 183 is fixed to the guide rod 182 while retaining the backlash. For this reason, the flapper 183 is capable of being independently rotated to some degree and is displaceable by a displacement amount Ys. In FIGS.

8A and 8B, a straight line Ds is a straight line connecting between the center position Xh when the flapper 183R is erected in the z direction and the center position Xa when the flapper 183R is rotated by the displacement amount Ys in the +y direction. Meanwhile, the displacement amount Ys is determined by the clearance T (see FIG. 7D), an opening area of the opening that allows insertion of the screw 187, and the like. The displacement amount Ys is set larger than the displacement amount Yp. The same concept also applies when the flapper 183L is displaced in the −y direction. The above-mentioned displacement amount Ys is set in a range approximately between 15 mm in the +y direction and 15 mm in the −y direction, for example. Moreover, the setting of the displacement amount Ys is also applicable to the case of causing each flapper 183 to follow the upper rod unit 350.

Figure 9A:
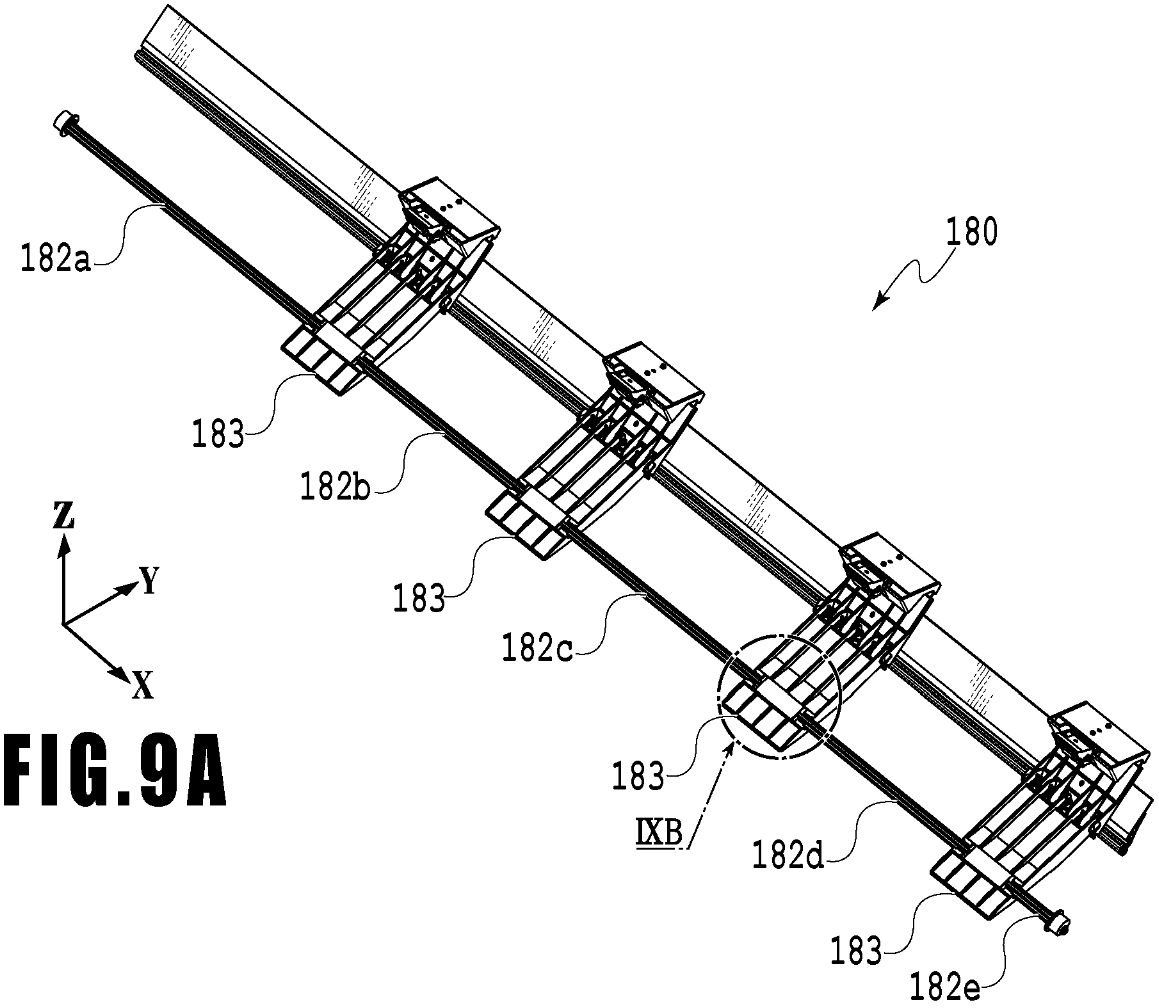
FIGS. 9A and 9B are explanatory diagrams showing a modified example of the guide flapper unit.
Figure 9B:
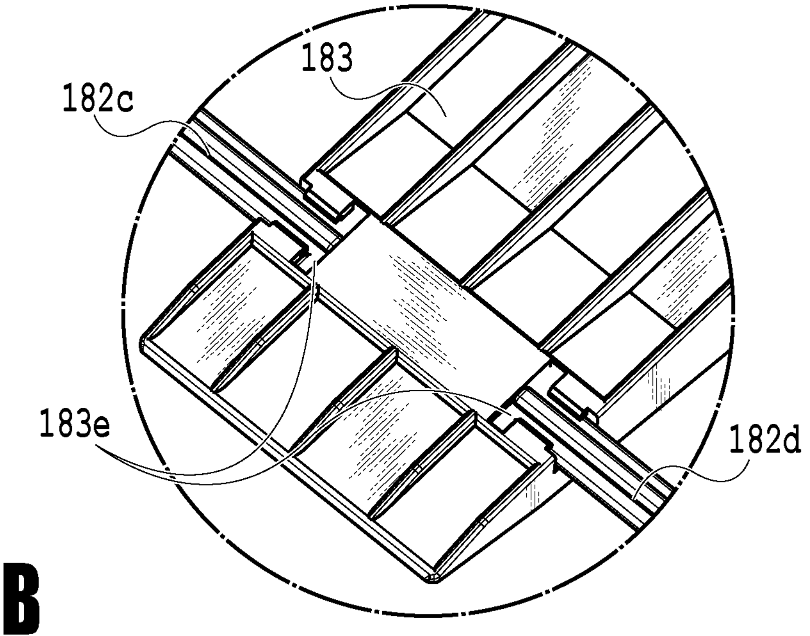

In a modified example, the flappers 183 adjacent to each other may be connected by using the guide rod 182 that is split into pieces while allowing each flapper 183 to retain the backlash. Specifically, the guide rod 182 is assumed to be formed from guide rod pieces 182*a*, 182*b*, 182*c*, 182*d*, and 182*e* as shown in FIG. 9A. Then, in the vicinity of the front end portion 183*a* of the flapper 183, end portions of the adjacent guide rod pieces may be connected to each other by using connecting portions 183*e* provided at two end portions in the x direction of the support surface 183*b* as shown in FIG. 9B. At this time, each connecting portion 183*e* is designed to be capable of connecting the end portion of the corresponding guide rod piece while retaining the backlash.

Figure 10:
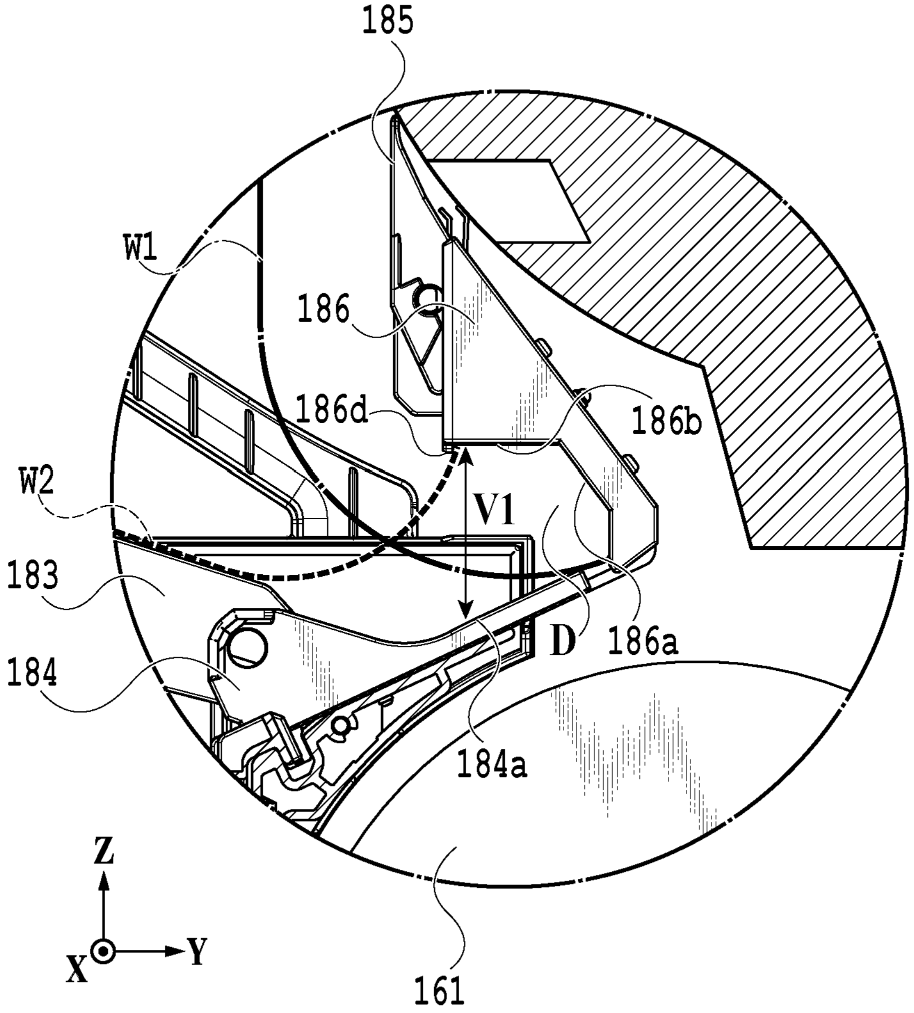
FIG. 10 is a schematic configuration diagram of a concave portion.

The concave portion D, which is formed by the guide 184, the sheet guide holder 186, and the guide plate 400, includes a first regulating surface 186*a* and a second regulating surface 186*b* of the sheet guide holder 186, and a third regulating surface 184*a* of the guide 184 as shown in FIG. 10. Meanwhile, a convex portion 186*d* in a projecting shape is provided in the vicinity of a front end portion of an upper surface (the second regulating surface 186*b*) of the concave portion D. The third regulating surface 184*a* being opposed to the second regulating surface 186*b* is formed into a downgrade from one end on an upstream side in the sheet discharge direction to another end on the other side (from the back side to the front side). Moreover, the concave portion D has a clearance V1 defined between a front end of the convex portion 186*d* and a point on the third regulating surface 184*a* vertically below the convex portion 186*d*. The clearance V1 is formed to be greater than a sum of a thickness of the maximum number of stacked sheets and a maximum value of a curling amount of the front end of the sheet, or more specifically, a distance from the lowermost position of the sheet in the state of drooping vertically downward to the front end of the sheet that is warped vertically upward to the maximum.

In this embodiment, the maximum number of stacked sheets is set to 100 sheets which are formed of plain paper having a large curling amount at a front end and being wound around a generally used paper tube having a 2-inch (50.8 mm) diameter. Each sheet of the plain paper has a thickness of 0.1 mm, and the thickness when stacking 100 sheets thereof is equal to 10 mm (=100×0.1). In the meantime, the maximum value of the curling amount of the front end of the sheet (that is, the distance from the lowermost position of the sheet in the state of drooping vertically downward to the front end of the sheet warped vertically upward, the sheet being located at a portion close to the paper tube at the beginning of winding the sheet) is equal to 10 mm. Accordingly, in this embodiment, a length of the clearance V1 is set equal to or above 20 mm (=100×0.1+10 mm). Meanwhile, the second regulating surface 186*b* is formed such that its length in the sheet discharge direction (that is, the discharge direction of the sheet or a depth direction of the concave portion D) is smaller than the radius (25.4 mm) of the paper tube. A height in a perpendicular direction of the convex portion 186*d* (that is, an amount of projection from the second regulating surface 186*b*) is formed greater than the maximum thickness of the sheet expected for use. In this embodiment, this height is defined greater than the thickness 0.1 mm of the plain paper.

As described above, in the printing apparatus 10, a reception mode of the receiver 40 is modifiable by combining aspects of the upper rod unit 350 and of the guide flapper unit 180 in the stacker 3. In other words, when the stacker 3 receives the discharged printed sheet, the user can select various reception modes of the stacker 3. Thus, the stacker 3 meets the need for diversification in printing modes. Details of various reception modes will be described below.

(First Reception Mode)

Figure 11A:
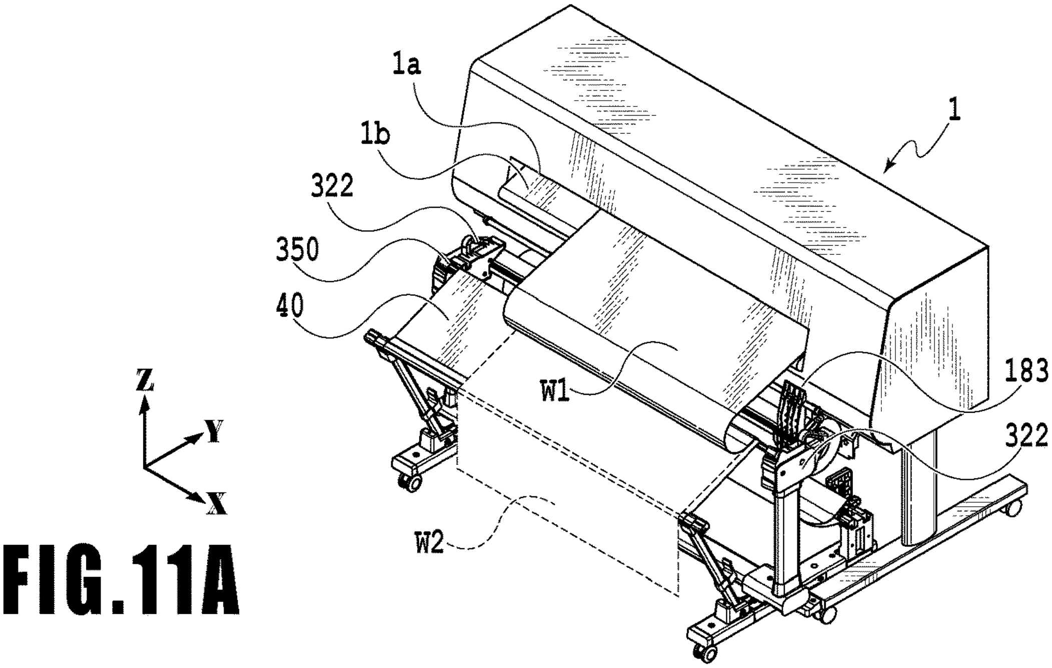
FIGS. 11A, 11B, and 11C are explanatory diagrams of a first reception mode.
Figure 11B:
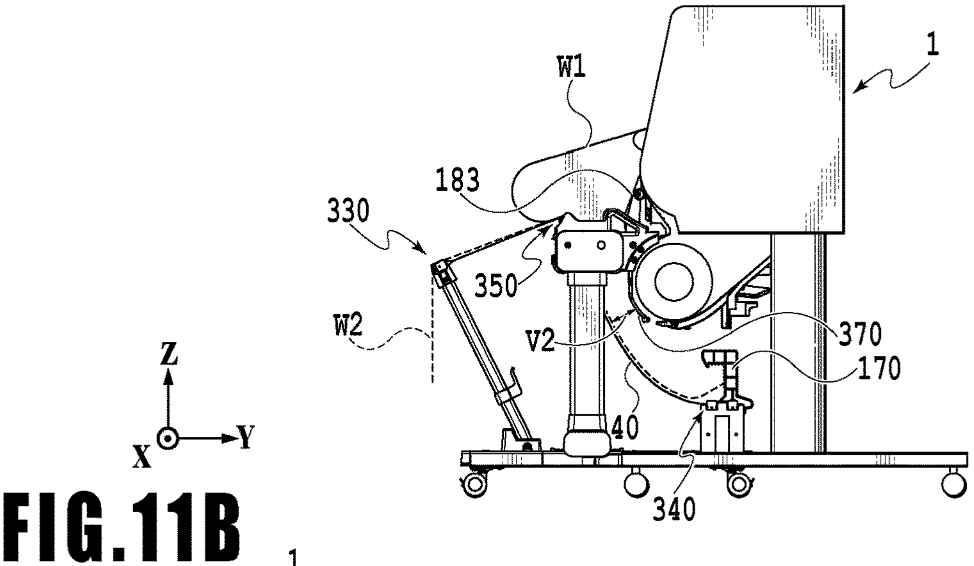
Figure 11C:
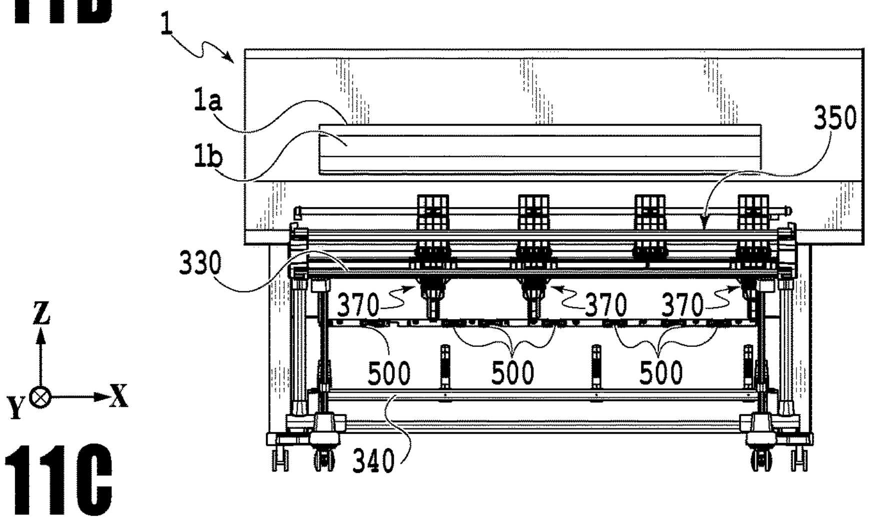

FIG. 11A is a perspective view of a printing apparatus according to a first reception mode, FIG. 11B is a right side view of the printing apparatus, and FIG. 11C is a front view of the printing apparatus. Note that illustration of the receiver 40 is omitted in FIG. 11C in order to facilitate the understanding. In this first reception mode, the upper rod unit 350 is positioned on the right and left upper rod bases 322. As shown in FIG. 11B, the receiver 40 is held in the shape of a "chevron" by using the upper rod unit 350, the front rod unit 330, and the rear rod unit 340, thus collectively forming the storage unit. Moreover, the length (slack) of the receiver 40 between the upper rod unit 350 and the rear rod unit 340 is determined in such a way as to define a clearance V2 between each first roll guide 371 and the receiver 40. Meanwhile, as shown in FIG. 11C, the multiple roll guide units 370 (three in this embodiment) are arranged so as not to be located at the same positions in terms of the x direction as supply units 500. Here, the roll guide unit 370 prevents the discharged sheet from entering a gap between each supply unit 500 and the roll sheet held by the roll sheet holder 161.

The roll guide unit 370 is located so as to be able to optimally guide standard-sized sheets having various sheet widths.

A printed sheet W1 discharged from the discharge port 1*a* is guided to the first sheet butting members 170 through the discharge port guide 1*b*, the guide surface 1*c*, the flappers 183, and the roll guide unit 370. Specifically, in this first reception mode, each flapper 183 is configured to guide the sheet W by using the guide surface 183*c*. Thus, the flappers 183 and the roll guide unit 370 collectively function as a guide member to guide the sheet W vertically downward (downward in a gravitational direction). Meanwhile, the front end of the sheet W guided by each flapper 183 is moved from the front end portion 183*a* side toward the rotating center 189 of the flapper 183. The sheet W1 is guided by the flappers 183 and the roll guide unit 370 with the curled front end thereof rotated to the body 1. Thus, the front end butts and stops at the first sheet butting members 170. As the sheet W1 is continuously conveyed in this state, a loop of the sheet W1 is formed on one side (the front side) away from the body 1 while using the upper rod unit 350 as an inflection point. Thereafter, the sheet W1 having been conveyed for a predetermined amount and then cut out is reversed by using the upper rod unit 350 as the inflection point, and is placed on the receiver 40 with its printed surface laid face-down like a sheet W2.

Figure 12A:
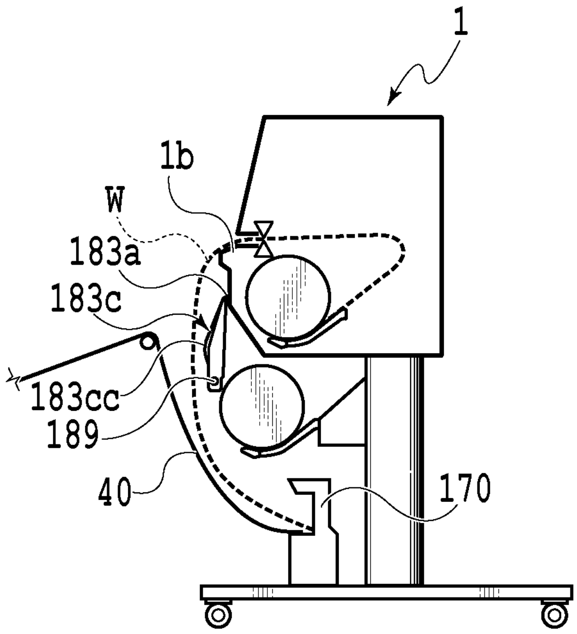
FIGS. 12A, 12B, 12C, and 12D are explanatory diagrams for explaining sheet buckling that occurs due to a difference in shape of the flapper.
Figure 12B:
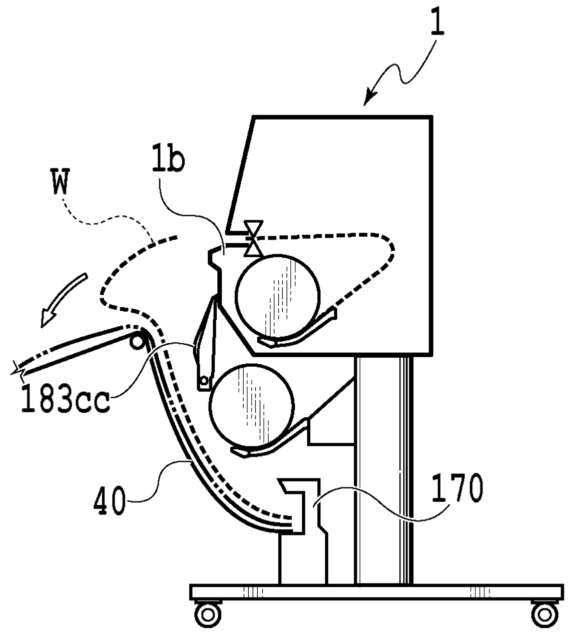

Here, the support surface 183*b* of each flapper 183 is formed into a flat shape. Meanwhile, the guide surface 183*c* of each flapper 183 is formed into a curved surface which extends from the front end portion 183*a* toward the rotating center 189 in a direction gradually receding from the support surface 183*b*, and then in a direction approaching from a predetermined position to the support surface 183*b*. In other words, the guide surface 183*c* is formed into a curved surface inclined in the direction to recede from the support surface 183*b* and then inclined in the direction to approach the support surface 183*b* gradually from the front end portion 183*a* toward the rotating center 189. Here, an inflection point where the guide surface 183*c* is changed from the receding direction to the approaching direction will be referred to as an apex 183*cc*. Moreover, each flapper 183 in the closed state is designed such that the front end portion 183*a* is located behind the rotating center 189 while the guide surface 183*c* is located away from (in front of) the guide surface 1*c* as compared to the discharge port guide 1*b* (a guide unit). Note that this design does not always require that the entire guide surface 183*c* be located in front of the discharge port guide 1*b*. Here, at least part of the guide surface 183*c* such as the apex 183*cc* is designed to be located in front of a front end of the discharge port guide 1*b*. Thus, when the front end of the sheet W comes into contact with the first sheet butting members 170, the sheet W receives reaction forces from each first sheet butting member 170 and the receiver 40, and also receives a reaction force from each guide surface 183*c* (each apex 183*cc*) as shown in FIG. 12A. Then, the reaction force from the guide surface 183*c* retains the posture of the sheet W without causing buckling, and as shown in FIG. 12B, the sheet W after being cut out is rotated over by the gravitational force and is stored in the storage unit. In other words, a rear end side of the cut sheet is surely placed on the receiver 40 side stretched between upper rod unit 350 and the front rod unit 330.

Figure 12C:
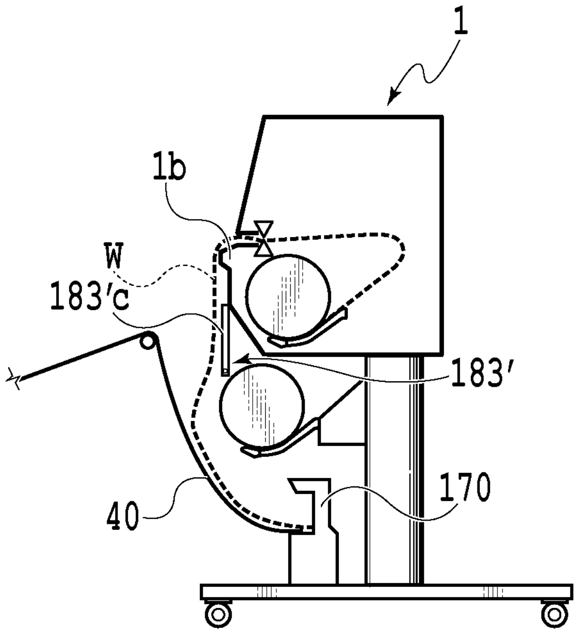
Figure 12D:
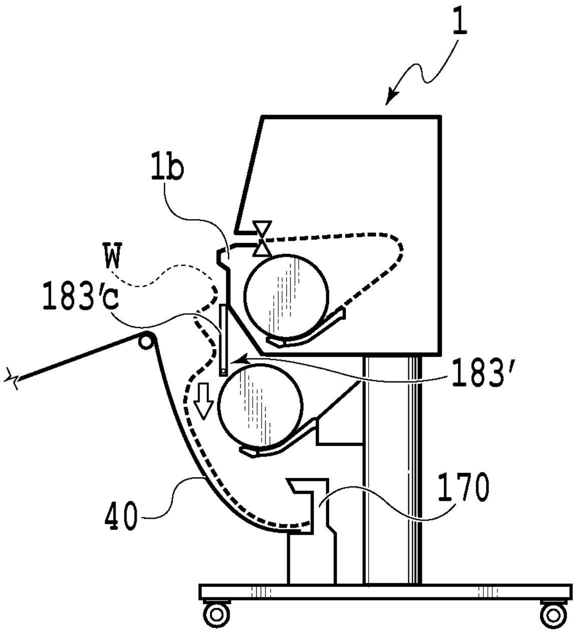

If each guide surface 183'*c* is formed into a flat shape and designed to be located behind the front end of the discharge port guide 1*b* as shown in FIG. 12C, the sheet W is deflected toward a flapper 183' due to the reaction forces from each first sheet butting member 170 and the receiver 40. If the sheet W is cut out in this state, the cut sheet may cause buckling as shown in FIG. 12D due to a small reaction force (or no reaction force) at the flapper 183'. In other words, the sheets may fail to be stacked and stored properly in the storage unit, and may instead be stored in a bad order in a space defined between the receiver 40 and the first sheet butting members 170.

Here, each flapper 183 only needs to be configured to apply the reaction force to the sheet W when the sheet W is deflected toward the flapper 183. Specifically, in this case, the apex 183*cc* may be aligned with the front end of the discharge port guide 1*b* in the y direction, or may be located behind the front end. Nonetheless, in order for the guide surface 183*c* to more efficiently generate the reaction force to the sheet W, it is preferable to locate the apex 183*cc* in front of the front end of the discharge port guide 1*b*.

Figure 13A:
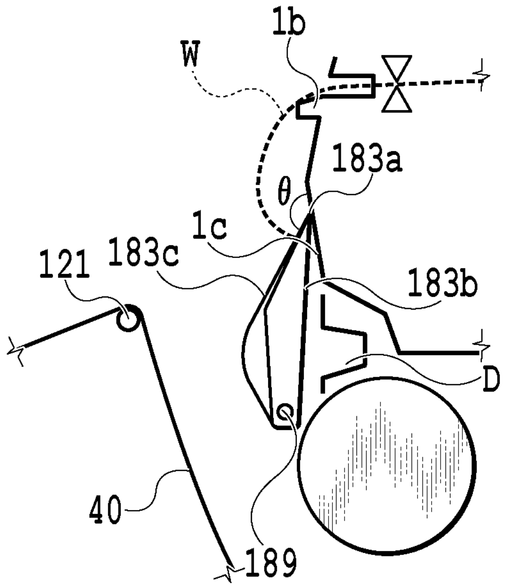
FIGS. 13A, 13B, 13C, and 13D are explanatory diagrams for explaining a front end of a sheet getting caught due to the difference in shape of the flapper.

In the meantime, each flapper 183 is formed into such a shape that the front end of the sheet W is hardly caught at the position of contact of the front end portion 183*a* with the guide surface 1*c* of the body 1 when the flapper is in the closed state. To be more precise, the flapper 183 is formed so as to taper toward its front end (a front end where the rotating center 189 is not located). Moreover, the flapper 183 is formed such that an angle θ defined between the guide surface 183*c* and the guide surface 1*c* has an obtuse angle as shown in FIG. 13A when the flapper 183 is in the closed state. Here, when the guide surface 1*c* that comes into contact with the front end portion 183*a* has a curved surface, the flapper 183 is formed such that an angle defined between the guide surface 183*c* and a tangent at a position of contact with the front end portion 183*a* of the guide surface 1*c* has an obtuse angle. On the other hand, when a region on the guide surface 1*c* from the front end portion 183*a* to the apex 183*cc* has a curved surface, the flapper 183 is formed such that an angle defined between the guide surface 1*c* and a straight line connecting the front end portion 183*a* in that region (to be more precise, one point at the front end) to the apex 183*cc* has an obtuse angle.

In this way, it is possible to guide the relatively strongly curled sheet W without causing its front end to be caught by the front end portion 183*a* of each flapper 183. Moreover, by forming the flapper 183 into any of the above-described shapes, a step formed in the vicinity of a position of contact with the upper rod unit 350 in the state where the flapper 183 is open is reduced as shown in FIG. 13C in a reception mode to come into contact with the upper rod unit 350 (to be described later). Accordingly, a load on the printed surface in the vicinity of the inflection point is small at the time of the face-down loading, and printing quality is hardly affected even when stacking a lot of the sheets W. In addition, it is possible to stack the sheets W stably on the support surface 183*b*.

Figure 13B:
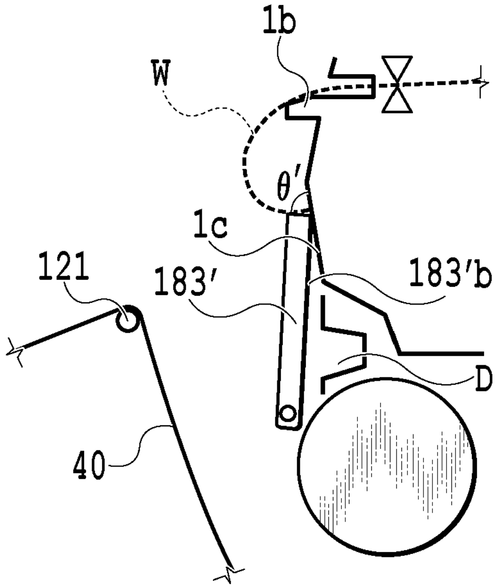
Figure 13C:
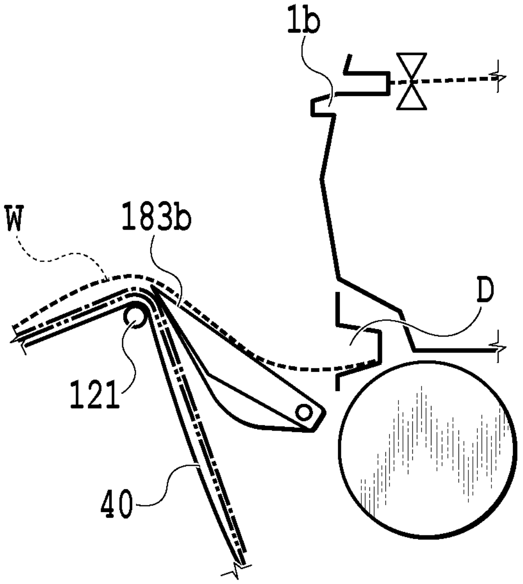
Figure 13D:
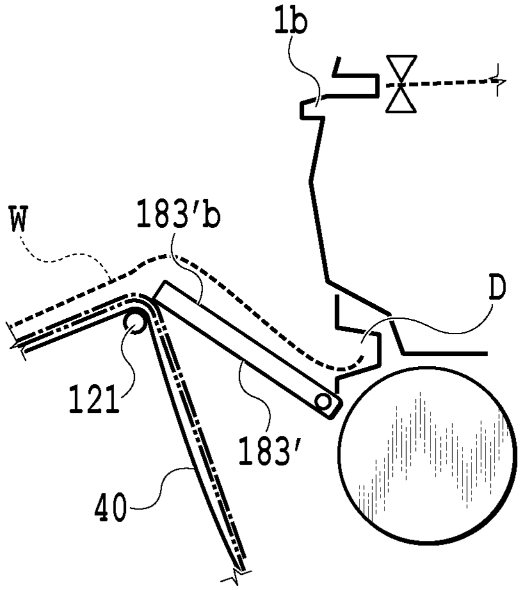

If each flapper 183' is formed in a uniform thickness and such that an angle θ' defined between the front end portion of the flapper 183' and the guide surface 1*c* has either a right angle or an acute angle as shown in FIG. 13B when the flapper 183' is in the closed state, the sheet W gets caught by the front end portion of the flapper 183'. Moreover, in the state where the flapper 183' having the above-mentioned shape is open, a large step is formed in the vicinity of the position of contact with the upper rod unit 350 as shown in FIG. 13D in the reception mode to come into contact with the upper rod unit 350. Accordingly, a load acting on the printed surface in the vicinity of the inflection point is increased at the time of the face-down loading, and printing quality may be affected when stacking a lot of the sheets W. In addition, the sheets W may slip off as a consequence of the concave portion D failing to support the front ends thereof, and the sheets W may be stacked in the curled state on a support surface 183'*b*.

The multiple ribs 183*ba* that form the support surface 183*b* of each flapper 183 are reinforced with ribs 183*bd* that extend in a direction intersecting (being orthogonal to) the direction of extension of the ribs 183*ba*. Here, the multiple ribs 183*bd* are provided and arranged along the direction of extension of the ribs 183*ba*. In the meantime, the multiple ribs 183*ca*-1 and 183*ca*-2 on the guide surface 183*c* side of each flapper 183 are reinforced with ribs 183*cd* that extend in a direction intersecting (being orthogonal to) the direction of extension of the ribs 183*ca*-1 and 183*ca*-2. Here, the multiple ribs 183*cd* are provided and arranged along the direction of extension of the ribs 183*ca*. The flapper 183 is designed such that a density of the ribs 183*bd* on the support surface 183*b* is higher than a density of the ribs 183*cd* on the guide surface 183*c*. In addition, the flapper 183 is designed such that each of the ribs 183*bd* and 183*cd* does not come into contact with the sheet when supporting or guiding the sheet.

Figure 14A:
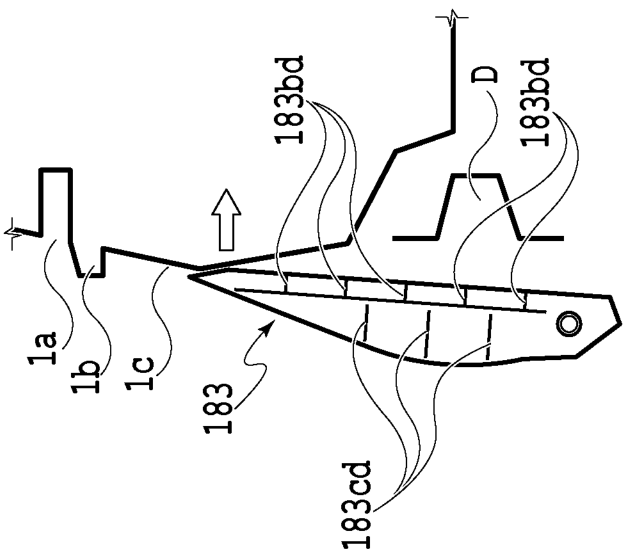
FIGS. 14A and 14B are explanatory diagrams for explaining ribs extending in an x direction of the flapper.
Figure 14B:
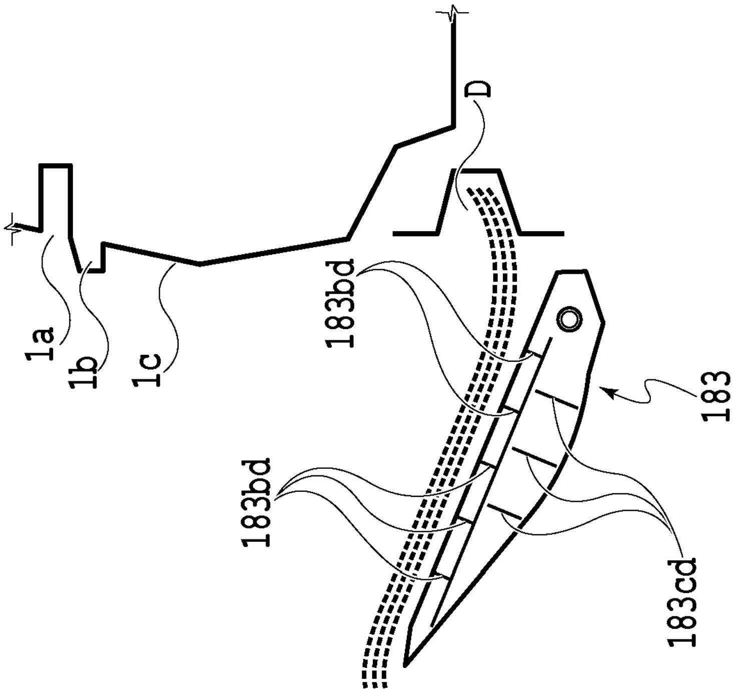

In this way, the flapper 183 is made robust and the gravitational center of the flapper 183 is surely positioned closer to the body 1 side as shown in FIG. 14A in the state where the flapper 183 is closed. Thus, the flapper 183 can easily retain the state of contact with the guide surface 1*c* due to its own weight. Meanwhile, as shown in FIG. 14B, the support surface 183*b* is made robust in the state where the flapper 183 is open, so that the support surface 183*b* can surely support a lot of the sheets W.

By forming the flapper 183 into the above-described shape, it is possible to achieve the various effects as described above without adding a new component to the flapper 183.

Figure 15A:
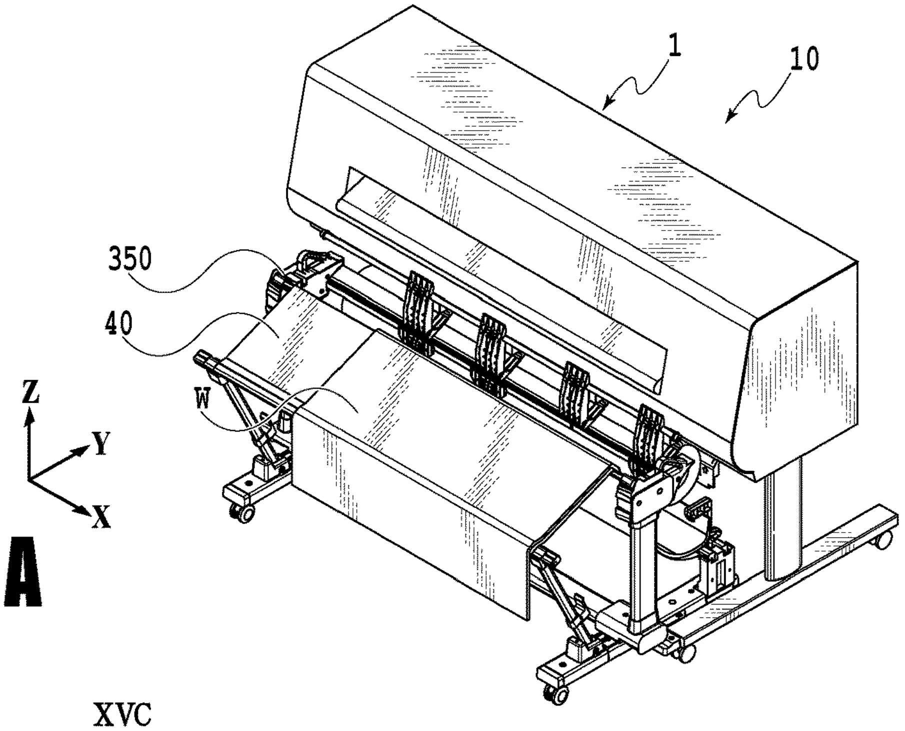
FIGS. 15A, 15B, and 15C are explanatory diagrams for explaining attachment of an upper rod.
Figure 15B:
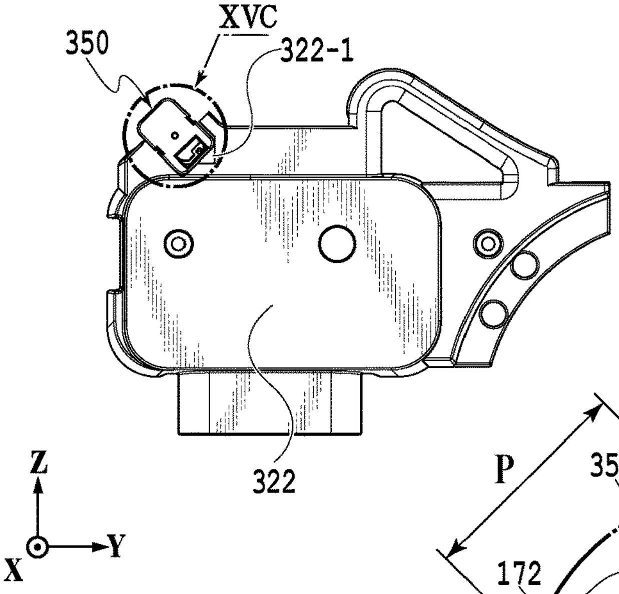

This first reception mode is a mode that is suitable for storage of sheets having a relatively large size (such as A0 portrait). According to the first reception mode, it is possible to stack a lot of the sheets (such as 100 sheets) in the state of placing the printed surfaces of the sheets downward (face-down sheet discharge) as shown in FIG. 15A. Here, the upper rod 121 is formed into a substantially rectangular sectional shape so that the front end portion 183*a* can stably come into contact therewith when the flapper 183 is in the open state. Moreover, in the upper rod unit 350, the rod caps 172 provided at the two end portions of the upper rod 121 are fitted into the fitting portions 322-1 provided at predetermined positions of the upper rod bases 322 as shown in FIG. 15B. At this time, it is preferable set a given surface of the upper rod 121 to such an inclination angle that substantially coincides with an inclination angle of the front end portion 183*a* (the guide surface 183*c* side) of the flapper 183 in the open state, so as to cause the given surface to come into surface contact with the front end portion 183*a* of the flapper 183.

Each fitting portion 322-1 includes a convex portion 322-1*c* that can be fitted into a groove portion 172*a* formed in each rod cap 172. Moreover, the fitting portion 322-1 is provided with a rotation regulating surface 322-1*e*, which regulates rotation of the rod cap 172 in a direction of an arrow G when the rod cap 172 is fitted into the fitting portion 322-1. Moreover, a height N of the convex portion 322-1*c* is set lower than a difference between a distance P from this rotation regulating surface 322-1*e* to a surface opposed thereto and a distance Q in a lateral direction of the rod cap 172.

When the rod cap 172 is configured to be simply fitted into the fitting portion 322-1, the upper rod unit 350 may be dragged by the weight of the sheets W when the user takes the 100 sheets W out of the storage unit, and the upper rod unit 350 may come off the upper rod bases 322. However, in the fitting portion 322-1, the convex portion 322-1*c* is fitted into the groove portion 172*a* and the rotation regulating surface 322-1*e* regulates the rotation in the direction of the arrow G Thus, the movement of the rod cap 172 is regulated so that the rod cap 172 can be prevented from coming off the fitting portion 322-1. Meanwhile, the upper rod unit 350 will not come off the upper rod bases 322 even if a large load is applied as a consequence of putting a blank roll sheet on the flapper 183, for example.

Figure 15C:
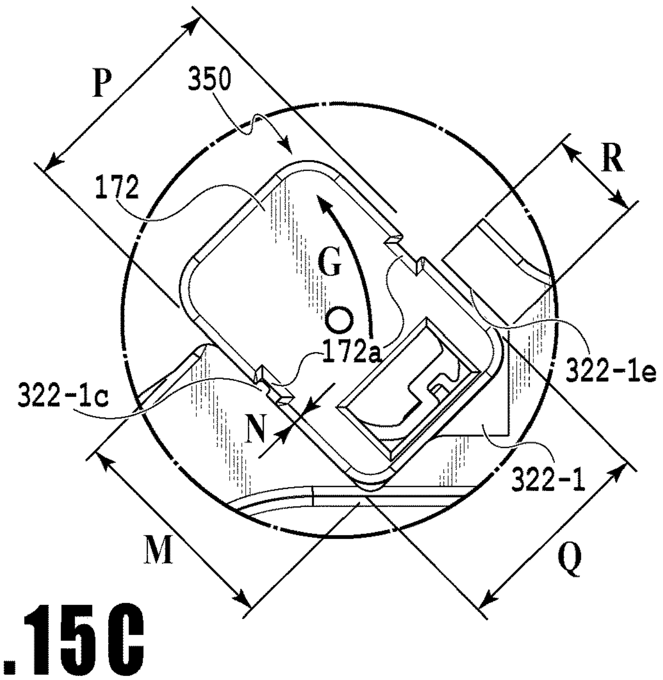
Figure 16:
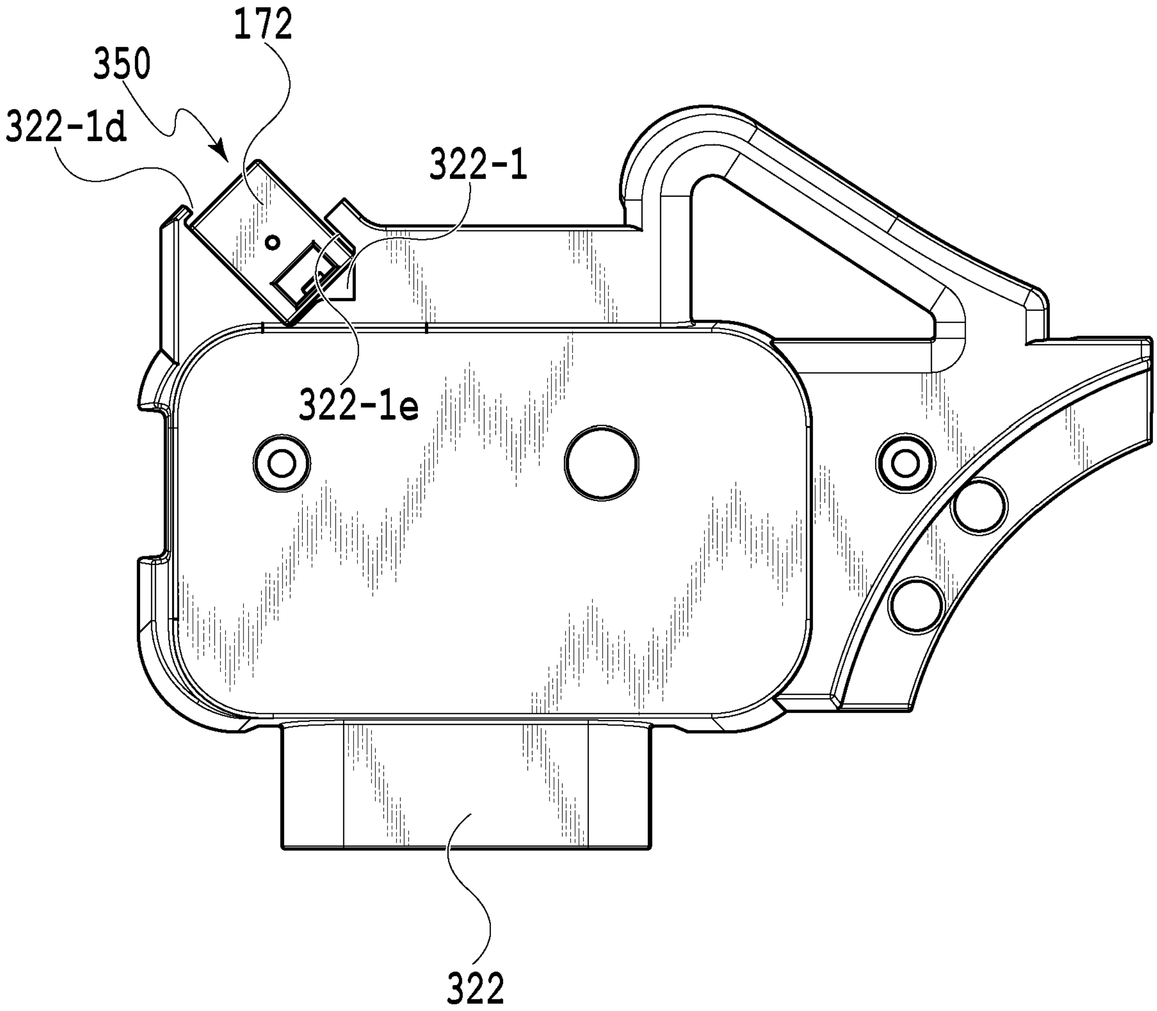
FIG. 16 is an explanatory diagram for explaining a modified example of the attachment of the upper rod.

In addition, as shown in FIG. 15C, a length R of the rotation regulating surface 322-1*e* is set shorter than a length M of a surface of the upper rod base 322 in contact with a side in the longitudinal direction of the rod cap 172. In this way, the upper rod unit 350 can be fitted into and detached from the fitting portion 322-1 easily. Here, instead of fitting the convex portion 322-1*c* of the fitting portion 322-1 into the groove portion 172*a* in the rod cap 172, a convex portion 322-1*d* configured to regulate movement in the longitudinal direction of the rod cap 172 may be provided as shown in FIG. 16. This configuration can also achieve the same effect.

(Second Reception Mode)

Figure 17A:
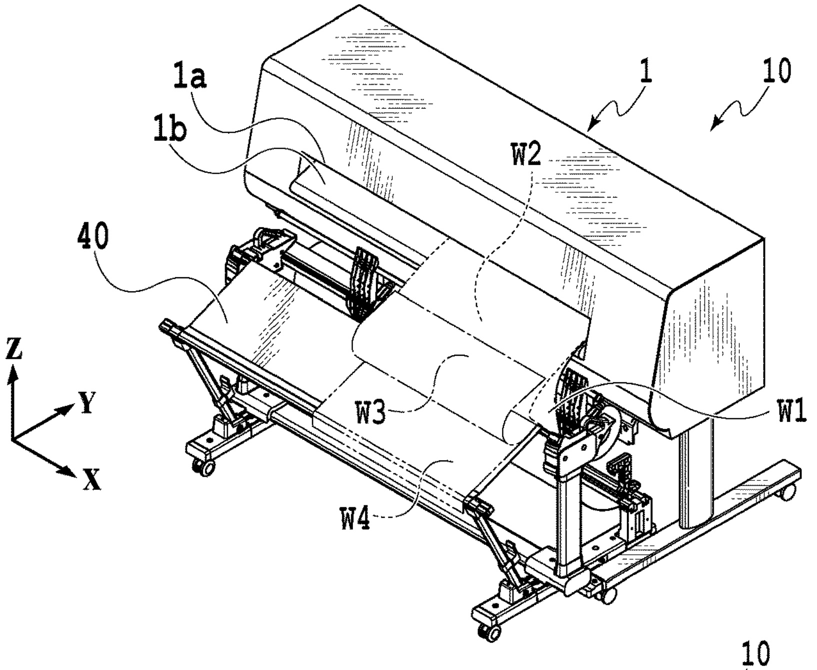
FIGS. 17A, 17B, and 17C are explanatory diagrams of a second reception mode.
Figure 17B:
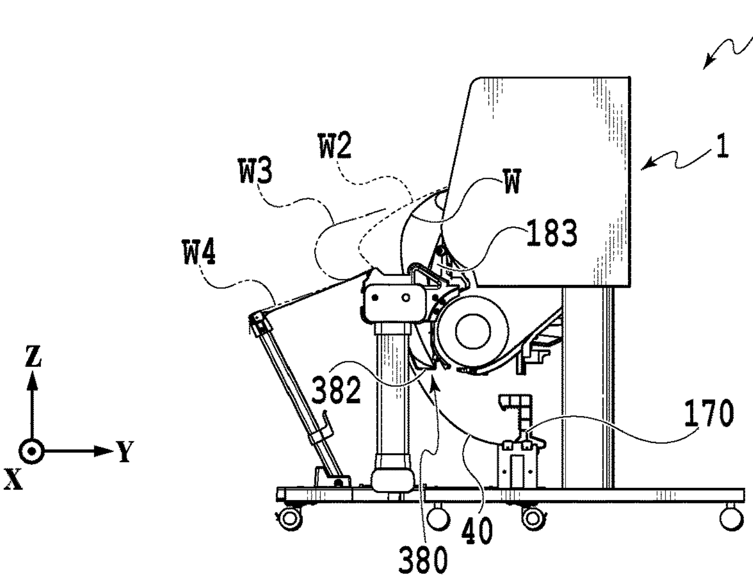
Figure 17C:
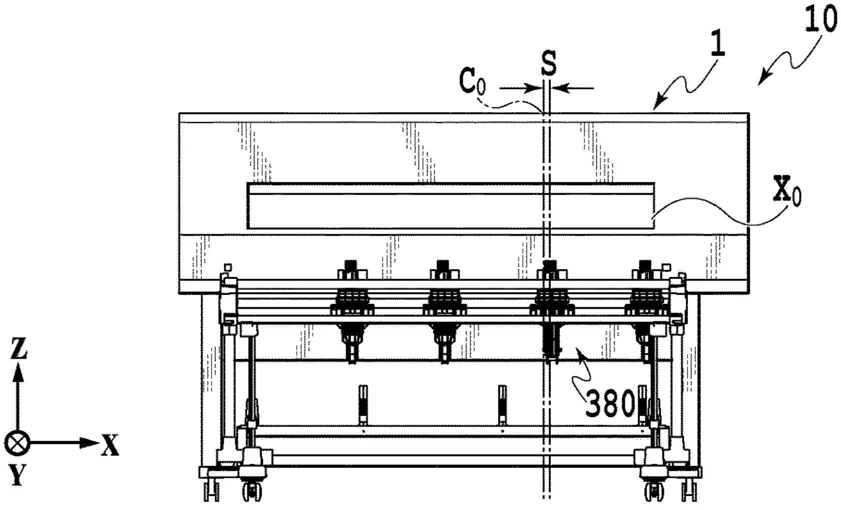

FIG. 17A is a perspective view of a printing apparatus according to a second reception mode, FIG. 17B is a right side view of the printing apparatus, and FIG. 17C is a front view of the printing apparatus. Note that illustration of the receiver 40 is omitted in FIG. 17C in order to facilitate the understanding. In this second reception mode, the second sheet stopper unit 380 is attached to the printing apparatus of the first reception mode described above. The wire tray 382 of the second sheet stopper unit 380 has the same function as that of the first sheet butting members 170.

A difference between the second reception mode and the first reception mode lies in the presence of the second sheet stopper unit 380. In other words, the printing apparatus 10 can change the reception mode merely by attaching or detaching the second sheet stopper unit 380. Note that the second sheet stopper unit 380 is subjected to weight saving by forming the guide surfaces for the sheets using ribs, fabricating the second sheet stopper unit 380 by using lighter materials, and the like. Moreover, the second sheet stopper unit 380 is positioned and attached by inserting the pin 381*a* into the hole portion 321*c* of the back stay 321 while allowing the lock part 381*b* to be caught with the groove portion 321*b* of the back stay 321 as shown in FIG. 21. For this reason, it is possible to attach and detach the second sheet stopper unit 380 easily, so that the user can easily change from the first reception mode to the second reception mode and vice versa.

In the printing apparatus 10 of the second reception mode, the printed sheet W1 discharged from the discharge port 1*a* is guided to the roll guide unit 370 and the second sheet stopper unit 380 through the discharge port guide 1*b*, the guide surface 1*c*, and the flappers 183. Specifically, in this second reception mode, each flapper 183 is configured to guide the sheet W by using the guide surface 183*c*. Thus, the flappers 183, the roll guide unit 370, and the like collectively function as the guide member to guide the sheet W downward. As shown in FIG. 17C, the second sheet stopper unit 380 is positioned by being shifted in the direction of the sheet end reference position Xo (to the right) by a predetermined amount S (which is 20 mm in this embodiment) with respect to a center position Co in terms of the width of the sheet W (such as A0 portrait).

Then, the sheet W1 is guided by the flappers 183, the roll guide unit 370, and the second sheet stopper unit 380 in the state where the curled front end of the sheet W1 is rotated to the body 1. Thereafter, the front end butts and stops at the wire tray 382 of the second sheet stopper unit 380. In other words, the front end of the sheet W1 is supported by the second sheet stopper unit 380. As the sheet W1 is continuously conveyed in this state, a loop of the sheet W is formed on the side (the front side) away from the body 1 like a sheet W2 and a sheet W3 while using the upper rod unit 350 as the inflection point. Thereafter, the sheet W having been conveyed for a predetermined amount and then cut out is reversed by using the upper rod unit 350 as the inflection point, and is placed on the receiver 40 with its printed surface laid face-down like a sheet W4. In other words, the wire tray 382 of the second sheet stopper unit 380 functions as a supporting unit to support the front end of the sheet W, and the sheet W is discharged while being supported by the supporting unit.

Note that in the printing apparatus 10, the cutter 6 cuts out the sheets while moving in the x direction from the sheet end reference position Xo side (moving from the right side to the left side). For this reason, the cut sheet is apt to fall obliquely from the sheet end reference position Xo side. In some cases, the sheets may be cut out in a significantly inclined state, and the sheets thus cut out may turn out to be non-standard products. On the other hand, in the printing apparatus 10, the second sheet stopper unit 380 is installed at the position shifted to the sheet end reference position Xo side. This makes it possible to prevent the sheets from falling obliquely when the sheets are cut out, and thus to reduce the sheets that turn out to be the non-standard products. Moreover, in the second reception mode, the sheet receives the reaction force also from the guide surface 183*c* (the apex 183*cc*) when the front end of the sheet comes into contact with the wire tray 382 as with the case in the first reception mode. As a consequence, the sheet is kept from buckling. In other words, the rear end side of the cut sheet is surely placed on the receiver 40 side stretched between upper rod unit 350 and the front rod unit 330.

This second reception mode is a mode that is suitable for storage of sheets (such as A1 portrait) which are smaller than the sheets in the above-described first reception mode. According to the second reception mode, it is possible to stack multiple sheets in the state of placing the printed surfaces of the sheets downward (face-down sheet discharge).

(Third Reception Mode)

Figure 18A:
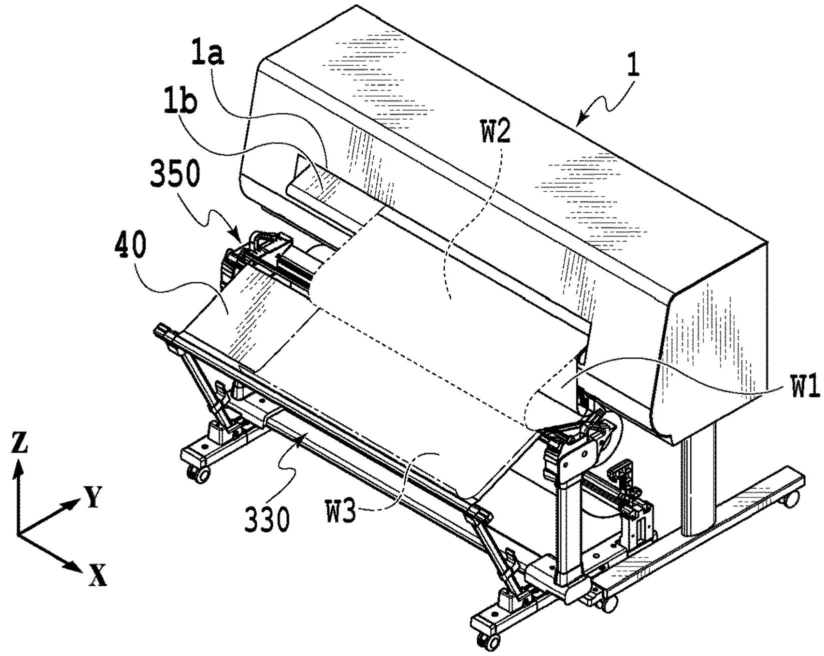
FIGS. 18A, 18B, and 18C are explanatory diagrams of a third reception mode.
Figure 18B:
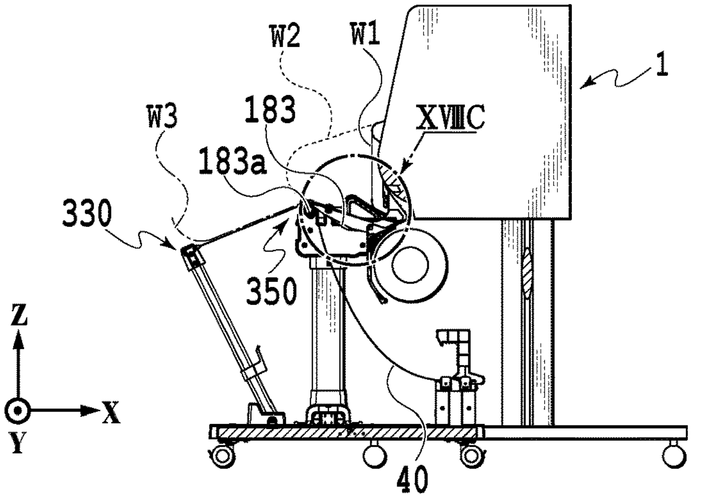
Figure 18C:
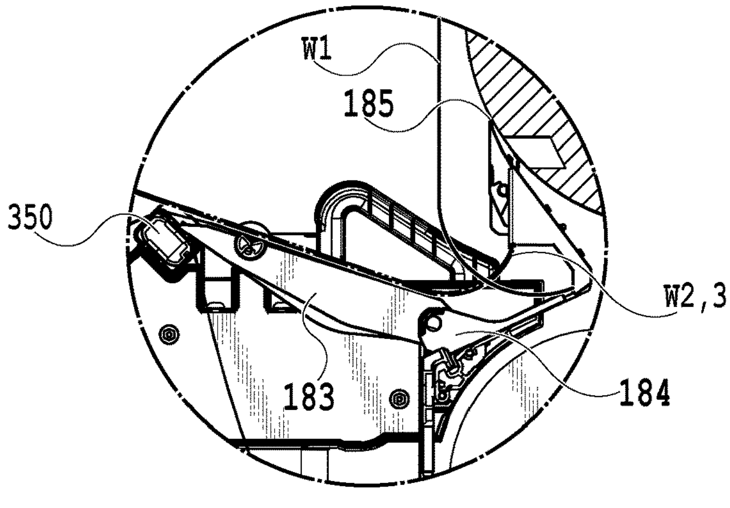

FIG. 18A is a perspective view of a printing apparatus according to a third reception mode, FIG. 18B is a right side view of the printing apparatus, and FIG. 18C is a partially enlarged diagram of a portion indicated with a frame XVIIIC in FIG. 18A. In this third reception mode, the flappers 183 of the printing apparatus according to the above-described first reception mode are in the open state. At this time, the front end portion 183*a* of each flapper 183 comes into contact with the upper rod unit 350, and the path to the corresponding first sheet butting member 170 is closed as shown in FIG. 18B. Meanwhile, as shown in FIG. 18C, the upper rod unit 350 fitted into the fitting portions 322-1 is configured such that the front end portions 183*a* of the flappers 183 can come into contact with the upper rod 121. Here, it is preferable that a surface of the upper rod 121 and a surface of each front end portion 183*a* come into contact with each other. In this way, the upper rod unit 350 functions as a bearing in the case of application of the weight of the sheets stacked on the flappers 183. Moreover, the upper rod unit 350 also functions as a support member that can support the sheets W through the receiver 40. Then, the flappers 183 in the open state and the receiver 40 stretched between the front rod unit 330 and the upper rod unit 350 collectively form the storage unit in a "mound shape". In other words, the support surfaces 183*b* of the flappers 183 in the open state and an upper surface of the stretched receiver 40 collectively form the "mound shape".

A difference between this third reception mode and the first reception mode lies in the state of each flapper 183. In other words, the printing apparatus 10 can change the reception mode merely by changing the flappers 183 from the closed state to the open state. As described previously, the flappers 183 are connected to one another by using the guide rod 182. Moreover, each flapper 183 is subjected to weight saving by forming the support surface 183*b* using the ribs 183*ba*, by forming the guide surface 183*c* using the ribs 183*ca*-2, and so forth. For this reason, it is possible to easily conduct an operation to change the flappers 183 from the closed state to the open state and from the open state to the closed state, and the user can easily change from the first reception mode to the third reception mode and vice versa.

In the printing apparatus 10 of the third reception mode, the printed sheet W1 discharged from the discharge port 1*a* is guided by the discharge port guide 1*b*, the guide surface 1*c*, the sheet guides 185, and the guides 184, and then butts and stops at the concave portion D. In other words, the concave portion D receives the front end of the sheet W1 and regulates the position of the front end of the sheet W1. Then, as the sheet W1 is continuously conveyed while the front end of the sheet W1 is regulated by the concave portion D, the front end portion of the sheet W1 (a predetermined region from the front end of the sheet) is discharged while being supported by the flappers 183. That is to way, in this third reception mode, the flappers 183 are configured to support the sheet W by using the support surfaces 183*b*. Meanwhile, the sheet W supported by the flappers 183 moves on each flapper 183 from the rotating center 189 side to the front end portion 183*a* side thereof, which is a direction opposite to a sheet movement direction when guiding the sheet W. Then, a loop of the sheet W is formed on the side (the front side) away from the body 1 like a sheet W2 while using the upper rod unit 350 as the inflection point. Thereafter, the sheet W having been conveyed for a predetermined amount and then cut out is reversed by using the upper rod unit 350 as the inflection point, and is placed with its printed surface laid face-down like a sheet W3. In other words, the receiver 40 stretched between the front rod unit 330 and the upper rod unit 350 functions as a supporting unit to support the rear end side of the sheet W3.

Here, in the case of discharging a sheet with its front end strongly curled inward, when the front end of the sheet butts the concave portion D (see reference numeral W1 in FIG. 10), the curl brings about a force that urges the front end of the sheet to curl up in a direction away from the body 1. Accordingly, if the sheet in this state is continuously conveyed, the sheet will curl up from its front end. However, the convex portion 186*d* is provided in the vicinity of the front end portion of the upper surface (the second regulating surface 186*b*) of the concave portion D. For this reason, the front end of the sheet having entered the concave portion D is caught by the convex portion 186*d* in the projecting shape, and is engaged with the convex portion 186*d* (see reference numeral W2 in FIG. 10). Since the sheet is discharged in the state where its front end is engaged with the convex portion 186*d* in the projecting shape, the concave portion D can suppress the curling up of the front end of the sheet. In contrast, the technique disclosed in Japanese Patent Laid-Open No. 2015-189522 does not provide a configuration corresponding to the convex portion 186*d* to suppress the curling up of the sheet. For this reason, when the sheet with its front end strongly curled inward is discharged, the sheet curls up from its front end and causes a storage failure. As described above, according to the third reception mode, it is possible to stack and store the sheets even when the sheets are strongly curled inward.

In the meantime, a length of the clearance V1 of the concave portion D is defined to be greater than the sum of the thickness of the maximum number of stacked sheets and the maximum value of the curling amount of the front end of the sheet. Accordingly, even when stacking the maximum number of the sheets with the strongly curled front ends, it is possible to store the sheets while preventing the front end of any sheet from causing jam at an entrance (the clearance V1) of the concave portion D. Moreover, the concave portion D is formed such that the length of the second regulating surface 186*b* in the sheet discharge direction (the y direction) is shorter than the radius of the paper tube. In other words, the length of the second regulating surface 186*b* is formed shorter than an inside diameter of the roll sheet formed by winding the sheets around. Furthermore, the height of the convex portion 186*d* (that is, the amount of projection) is formed greater than the maximum thickness of the sheet expected for use. Accordingly, even in the case of placing and storing the sheets each having the front end strongly curled inward, the front end of each sheet is surely caught by the convex portion 186*d* before exceeding the center line of the curl. Thus, the sheets can be prevented from curling up.

Meanwhile, the multiple reception members, each of which is formed from the flapper 183, the concave portion D, and the like, are arranged in the x direction as shown in FIG. 1A. Here, two side portions in the width direction (the x direction) of the front end of the discharged sheet are strongly curled in particular. Accordingly, it is preferable to locate the reception members at least at positions corresponding to the two side portions, respectively, in order to reliably regulate the curl of the two side portions. In other words, the reception members only need to be provided at least at the two positions corresponding to the two side portions in the width direction of the sheet expected for use.

Note that this third reception mode is a mode that is suitable for storage of sheets (such as A1 landscape and A2 landscape) which are of a smaller size than the sheets in the above-described first and second reception modes. According to this reception mode, it is possible to stack multiple sheets in the state of placing the printed surfaces downward (face-down sheet discharge).

(Fourth Reception Mode)

Figure 19A:
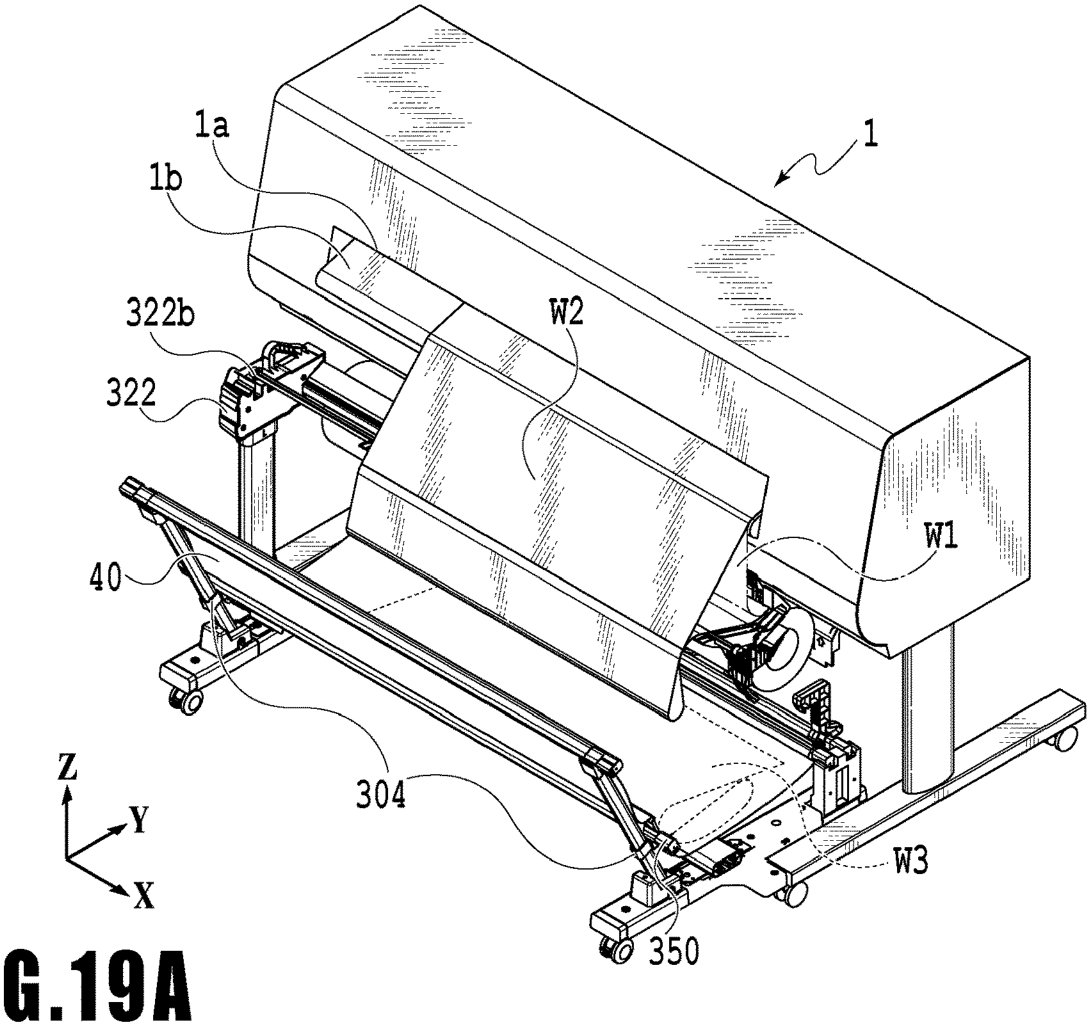
FIGS. 19A and 19B are explanatory diagrams of a fourth reception mode.
Figure 19B:
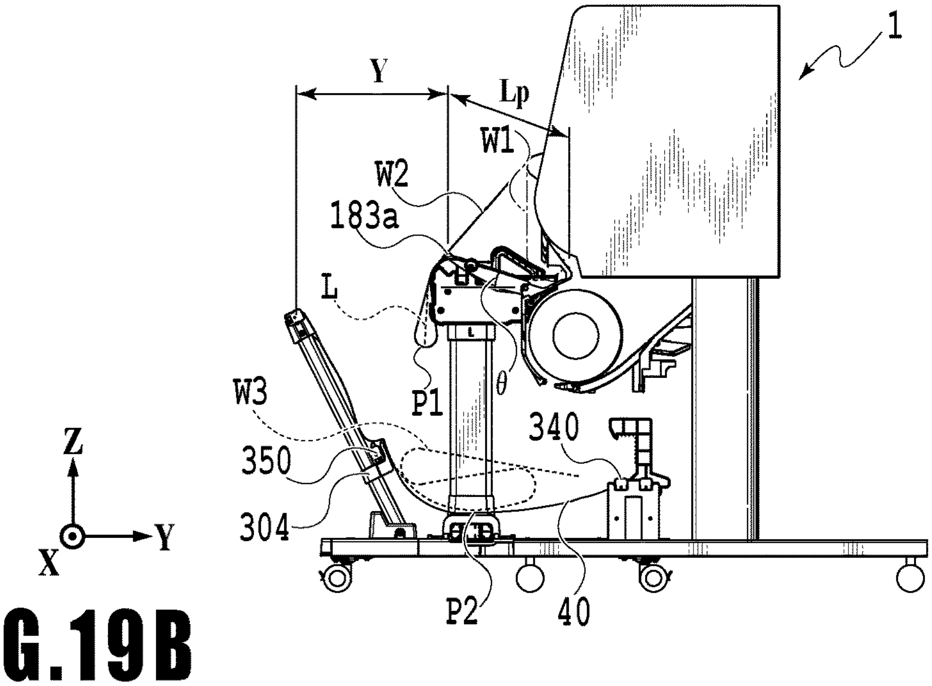

FIG. 19A is a perspective view of a printing apparatus according to a fourth reception mode and FIG. 19B is a side view of the printing apparatus. Note that in FIG. 19A, illustration of the leg 312, the upper rod base 322, and the like on the right side is omitted in order to facilitate the understanding. In this fourth reception mode, the upper rod unit 350 in the printing apparatus of the third reception mode described above is moved onto the rod holders 304. For this reason, the receiver 40 becomes slack and curved due to its own weight, and is thus formed into a bursiform shape that can receive the entire sheets. In this way, the storage unit is formed into a bursiform shape. In other words, in the stacker 3, the receiver 40 is curved by its own weight and a lowermost point P2 located at the lowermost position is located below the rear rod unit 340. Meanwhile, since the upper rod unit 350 is moved toward the front rod unit 330, a space defined by the receiver 40 is formed wide in the depth direction (the front-back direction).

Here, regarding the bursiform shape of the receiver 40 in the fourth reception mode, the length of the receiver 40 can be adjusted by rotating the upper rod unit 350 so as to wind the receiver 40 around the upper rod unit 350, for example. In other words, by enabling the rod holders 304 to regulate the rotation of the upper rod unit 350 placed thereon, the rotation of the upper rod unit 350 having the rectangular sectional shape is regulated as a consequence. In this way, the shape of the receiver 40 is not changed by the weight of the received sheets, so that the receiver 40 can maintain the shape and the length as intended.

Meanwhile, in the fourth reception mode, the flappers 183 are in the open state. Hence, the flappers 183 project toward a space between the discharge port 1*a* and the storage unit formed from the receiver 40. At this time, the cap members 181 on the two sides of the guide rod 182 come into contact with the flat surface portions 322*b* of the upper rod bases 322, thereby positioning the flappers 183. In other words, the storage unit is configured to include a region located below in the direction of gravity of the flappers 183 in the open state. Thus, a sheet storage space in the storage unit is formed to include the region immediately below the flappers 183.

A difference between the fourth reception mode and the first reception mode lies in the state of the flappers 183 and the position of the upper rod unit 350. In other words, the printing apparatus 10 can change the reception mode merely by changing the flappers 183 from the closed state to the open state and moving the upper rod unit 350 onto the rod holders 304. Here, each flapper 183 is subjected to the weight saving as described previously. Moreover, the upper rod unit 350 is also subjected to weight saving by forming the upper rod 121 as a hollow structure, for example, and is made easily attachable and detachable. For this reason, it is possible to conduct operations to change the state of the flappers 183 and to move the upper rod unit 350 easily, and the user can easily change from the first reception mode to the fourth reception mode and vice versa.

As with the above-described third reception mode, in the printing apparatus 10 of the fourth reception mode, the printed sheet W1 discharged from the discharge port 1*a* is guided by the discharge port guide 1*b*, the guide surface 1*c*, the sheet guides 185, and the guides 184, and then butts and stops at the concave portion D. Then, as the sheet W1 is continuously conveyed while the front end of the sheet W1 is regulated by the concave portion D, the front end portion of the sheet W1 is discharged while being supported by the flappers 183. That is to way, in this fourth reception mode, the flappers 183 are configured to support the sheet W by using the support surfaces 183*b*. Then, a loop of the sheet is formed downward in a gravitational direction while using the front end portion 183*a* of each flapper 183 as the inflection point, and a following portion of the sheet droops down in the storage space while forming a loop shape. At this time, the loop drooping down from the front end portions 183*a* does not come into contact with other components such as the receiver 40. Thereafter, the sheet having been conveyed for a predetermined amount while retaining the loop and then cut out falls into the bursiform receiver 40, and is then placed and stored therein in a loosely folded state.

What is important here is that the front end portion of the sheet including the front end thereof is located on the concave portion D and the flappers 183 before the sheet is cut out, and the sheet is stored and placed on the receiver 40 after the sheet is cut out. The rear end of the sheet is held by the body 1 before the sheet is cut out. Accordingly, the center of gravity of the sheet is located closer to the body 1 than to the front end portions 183*a* of the flappers 183. For this reason, the sheet is kept from falling even when the sheet is formed into the loop by drooping downward in a gravitational direction while using the front end portions 183*a* as the inflection point, and the front end portion of the sheet is located on the concave portion D and the flappers 183. Thereafter, when the sheet is cut out, the rear end of the sheet is no longer held by the body 1 and the center of gravity of the sheet transitions away from the body 1 relative to the front end portions 183*a* of the flappers 183. For this reason, an intermediate portion of the sheet formed into the loop starts falling onto the receiver 40 due to its own weight, and is stored in a loosely folded state while retaining the loop shape.

In this case, the support surface 183*b* of each flapper 183 is preferably horizontal or formed into an upgrade that rises from the body 1 and the discharge port 1*a* due to the following reason. Specifically, if the support surface 183*b* is formed into a downgrade, the center of gravity of the sheet tends to transition in a direction away from the body 1 as the sheet forms the loop. As a consequence, the sheet is prone to fall onto the receiver 40 before being cut out. In consideration of consistency with other reception modes, the fourth reception mode employs the shape of the flapper 183 in which the support surface 183*b* is formed into the upgrade that rises toward the front end portion 183*a* of the flapper 183.

As described above, in the stacker 3, the upper rod unit 350 is moved onto the rod holders 304 and the storage unit including the receiver 40 formed into the bursiform shape is located in the region below in the direction of gravity of the flappers 183. Thus, it is possible to form the loop that droops down from the front end portions 183*a* of the flappers 183 without any interference from other components. Accordingly, in the stacker 3, the sheet having been cut out falls while retaining the loop shape, and is then loosely folded and stored by using the loop shape. For this reason, when the sheets are continuously stored, the sheets will be stacked in the loosely folded state. In this way, the stacker 3 can make effective use of the space in the height direction of the storage unit, store a larger number of the sheets, and reliably store the sheets irrespective of the degree and length of the curl of the sheets.

Figure 20:
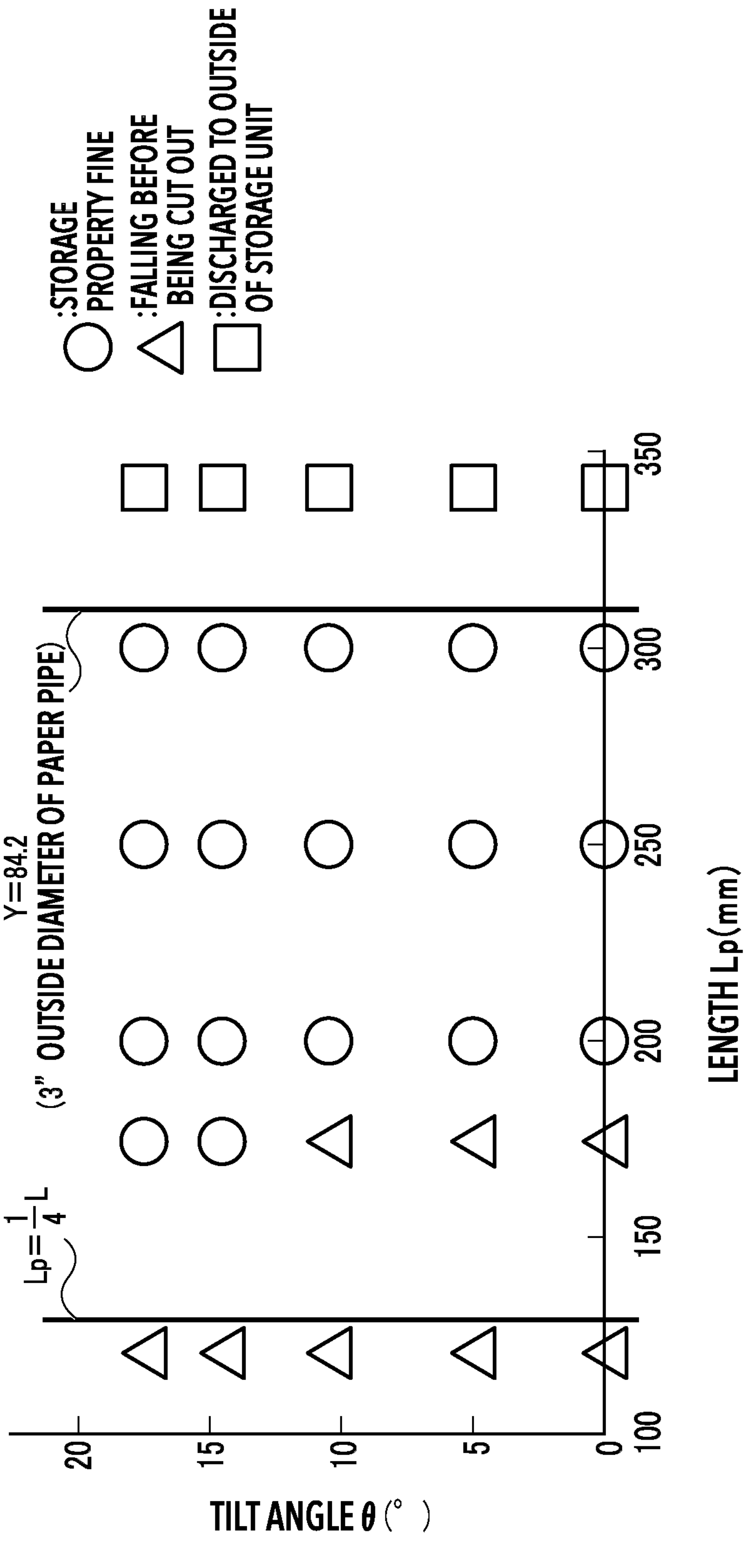
FIG. 20 is an explanatory diagram showing experimental data on an inclination angle and a length of a flapper in a fourth reception mode.

Here, FIG. 20 shows experimental results of investigating behaviors of the fall of the sheets with various lengths which are located on the flappers 183 and the concave portion D inclusive of the guides 184. In FIG. 20, a length Lp represents a length from the concave portion D to the front end portion 183*a* of each of the flappers 183. Meanwhile, a length L represents a length of the sheet from the front end of the sheet regulated by the concave portion D to a lower end P1 of the loop drooping down through the front end portions 183*a*. In the meantime, an inclination angle θ of the flapper 183 represents an angle of the upgrade of the support surface 183*b* of the flapper 183 where its horizontal state is defined as "0°". Meanwhile, a length Y represents a length in the depth direction (the front-back direction) between each front end portion 183*a* and the front rod 20, or in other words, a length in the horizontal direction from an upper front end portion of the storage unit to the front end portion 183*a*. Note that the lengths Lp, L, and Y and the inclination angle θ are illustrated in FIG. 19B.

When the length Lp is shorter than ¼L, the center of gravity of the sheet before being cut out is located further away from the body 1 than the front end portion 183*a* of each flapper 183 is, whereby the sheet located on the flappers 183 and the guides 184 falls into the storage unit before the sheet is cut out. For this reason, the length Lp is preferably set equal to or above ¼ of the length L. In this way, it is possible to locate the center of gravity of the sheet before being cut out closer to the body 1 (on the rear side) than to the front end portions 183*a*.

Moreover, it is preferable to set the length Lp shorter than the length Y. Here, if the length Y is shorter than an outside diameter of the paper tube of the roll sheet to be stored (that is, an inside diameter of the roll sheet), the sheet may be discharged to the outside of the storage unit due to the curl of the sheet and the like. In this regard, it is preferable to set the length Y longer than the outside diameter of the paper tube of the roll sheet to be stored. This makes it possible to store the sheet, which is formed into the loop, on the receiver 40 without dropping the sheet off the storage unit.

In this fourth reception mode, when the receiver 40 is formed into the bursiform shape, it is preferable to locate the lowermost point P2 of the receiver 40 closer to the body 1 (on the rear side) than is the case for the lower end P1 of the loop drooping down from the front end portions 183*a*. Alternatively, the lowermost point P2 may be positioned further away from the body 1 (on the front side) than the lower end P1 is. In other words, it is preferable to incline the receiver 40 below in the direction of gravity of the lower end P1, that is, an inner surface of the storage unit by use of a positional relation between the lowermost point P2 and the lower end P1. In this way, the sheet which is cut out and falls while retaining the looped shape is loosely folded by efficiently using the loop shape while employing the inclined surface formed by the receiver 40. This fourth reception mode assumes the use of sheets of plain paper and coated paper in standard sizes such as A0 and B0, which are widely used mainly for drawings, posters, and the like. However, the present invention is not limited only to the use of these standard sizes. In the meantime, it is also possible to store sheets in two or more sizes at the same time.

As described above, the printing apparatus 10 is provided with the stacker 3, which is movable relative to the body 1 and installable at the storage position. In addition, the stacker 3 includes the multiple flappers 183 rotatably provided along the sheet width direction and configured to support the sheet when the flappers 183 are in the open state and to guide the sheet when the flappers 183 are in the closed state. Here, each flapper 183 is configured to come into contact with the guide surface 1*c* of the body 1 when the flapper 183 is in the closed state for guiding the sheet, and to maintain this state. Meanwhile, each flapper 183 is configured to come into contact with the upper rod unit 350 when the flapper 183 is in the open state for supporting the sheet, and to maintain this state.

Accordingly, in the stacker 3, the flappers 183 are configured to support the sheet or to guide the sheet depending on the reception mode. For this reason, as compared to the technique disclosed in Japanese Patent Laid-Open No. 2015-189522, in which the configuration to support the sheet and the configuration to guide the sheet are separately provided depending on the reception mode, the stacker 3 has simplified mechanisms for supporting the sheet and for guiding the sheet. Moreover, the space created as a result of the simplification is utilized as described in the fourth reception mode, for example. Thus, it is possible to provide the wide storage space and to improve the degree of freedom of design.

Moreover, the stacker 3 is capable of changing each flapper 183 between the shape for guiding the sheet and the shape for supporting the sheet merely by rotating the flapper 183. Furthermore, each flapper 183 does not require a new configuration for maintaining the flapper 183 in the open state and in the closed state. Thus, the stacker 3 is capable of changing the reception mode easily as compared to the technique disclosed in Japanese Patent Laid-Open No. 2015-189522, which is configured to change between the mode to support the sheet with the reception member and the mode to guide the sheet with the guide member by moving the reception member and the guide member that are relatively large and heavy. As a consequence, the stacker 3 reduces a burden on the user for changing the reception mode.

Meanwhile, in the stacker 3, a part near the front end portion 183*a* of each flapper 183 is connected to the guide rod 182 while retaining the certain degree of freedom so as to be rotatable within the predetermined range. Furthermore, there is provided the sheet guide 185 configured to guide the front end of the sheet to the concave portion D for regulating the position of the front end when the flapper 183 is in the open state. This sheet guide 185 is rotatably provided to the sheet guide holder 186 and is biased such that the front end portion 185*b* comes into contact with the body 1 when the stacker 3 is installed at the storage position.

Accordingly, in the case where the stacker 3 is moved and installed at the storage position relative to the body 1, when the front end portion 183*a* of the flapper 183 comes into contact with the body 1 and the upper rod 121, the front end portion 183*a* follows the body 1 and the upper rod 121 while absorbing the component tolerances and the assembly errors. As a consequence, no sheets get stuck between the front end portion 183*a* and the body 1. Moreover, when the flapper 183 is in contact with the upper rod 121, an unexpected load will not be applied to the flapper 183 even if a lot of sheets are stacked. Accordingly, the flapper 183 is less likely to be damaged. Furthermore, in the case where the stacker 3 is moved and installed at the storage position relative to the body 1, when the front end portion 185*b* of the sheet guide 185 comes into contact with the body 1, the sheet guide 185 is rotated so as to absorb the component tolerances and the assembly errors. In this way, when the stacker 3 is installed at the storage position, it is possible to prevent the front end portion 185*b* of the sheet guide 185 from butting the body 1, and thus to suppress damage on the body 1.

The above-described embodiment has cited the printing apparatus 10 as an example, which is configured to store the printed and discharged sheets in the stacker 3. However, the present invention is not limited only to this configuration. Specifically, the stacker 3 may be configured to store sheets discharged from various sheet processing apparatuses, such as image scanners, which are configured to conduct predetermined processing on the sheets. In addition, the printing apparatus 10 may also use sheets other than the sheets reeled out of the roll.

As described above, according to the present invention, it is possible to provide a sheet storage device configured to store printed and discharged sheets, and to provide a printing apparatus including the sheet storage device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-95687, filed May 12, 2017, which is hereby incorporated by reference herein in its entirety.

What is claimed is:

1. A sheet storage device capable of storing a sheet discharged from a discharge port of a printing apparatus in a discharge direction, comprising:

a receiver having a first end portion and a second end portion and configured to stack the sheet discharged from the discharge port;

a foot provided with a caster for moving the sheet storage device relative to the printing apparatus;

a first supporting unit rotatably held by the foot and configured to move the first end portion relative to the discharge port;

a second supporting unit held by the foot and configured to support the second end portion disposed at a position closer to the discharge port than a position of the first end portion, the second supporting unit being lower than the first supporting unit; and a leg unit provided between the first supporting unit and the second supporting unit with respect to the discharge direction, and attached to the foot so as not to rotate about the foot, wherein the receiver is deformed into a first form in which a part between the first end portion and the second end portion is supported by the leg unit and a second form in which the part is not supported by the leg unit.

2. The sheet storage device according to claim 1, further comprising:

a flapper unit supported by the leg unit and configured to rotate between a first position and a second position different from the first position.

3. The sheet storage device according to claim 2, wherein the flapper unit has a plurality of flappers in a width direction of the sheet.

4. The sheet storage device according to claim 3, wherein in a case in which the flapper unit is at the first position, the flappers are inclined so that front ends of the flappers become higher in the discharge direction.

5. The sheet storage device according to claim 2, wherein a front end of the sheet discharged from the discharge port is supported by a first surface of the flapper unit in a case in which the flapper unit is at the first position, and moves to a side of the second end portion along a second surface opposite to the first surface of the flapper unit in a case in which the flapper unit is at the second position.

6. The sheet storage device according to claim 1, further comprising:

a rod configured to hold the part of the receiver, wherein in a case in which the receiver is in the first form, the rod is supported by the leg unit.

7. The sheet storage device according to claim 6, further comprising:

a flapper unit supported by the leg unit and configured to rotate between a first position and a second position different from the first position, wherein in a case in which the receiver is in the first form, a front end of the flapper unit in a case in which the flapper unit is at the first position is closer to the rod than in a case in which the flapper unit is at the second position.

8. The sheet storage device according to claim 1, wherein a height of the leg unit is greater than a height of the first supporting unit.

9. The sheet storage device according to claim 1, wherein the leg unit has a first leg on one side of the receiver in a width direction of the sheet and a second leg on the other side of the receiver.

10. A printing apparatus comprising:

a printing unit configured to print an image on a sheet;

a discharge port configured to discharge, in a discharge direction, the sheet on which the printing unit prints the image;

a receiver having a first end portion and a second end portion and configured to stack the sheet discharged from the discharge port;

a foot provided with a caster for moving a sheet storage device relative to the printing apparatus;

a first supporting unit rotatably held by the foot and configured to move the first end portion relative to the discharge port;

a second supporting unit held by the foot and configured to support the second end portion disposed at a position closer to the discharge port than a position of the first end portion, the second supporting unit being lower than the first supporting unit; and a leg unit provided between the first supporting unit and the second supporting unit with respect to the discharge direction, and attached to the foot so as not to rotate about the foot, wherein the receiver is deformed into a first form in which a part between the first end portion and the second end portion is supported by the leg unit and a second form in which the part is not supported by the leg unit.

11. The printing apparatus according to claim 10, further comprising:

a flapper unit supported by the leg unit and configured to rotate between a first position and a second position different from the first position.

12. The printing apparatus according to claim 11, wherein a front end of the sheet discharged from the discharge port is supported by a first surface of the flapper unit in a case in which the flapper unit is at the first position, and moves to a side of the second end portion along a second surface opposite to the first surface of the flapper unit in a case in which the flapper unit is at the second position.

13. The printing apparatus according to claim 10, further comprising:

a rod configured to hold the part of the receiver, wherein in a case in which the receiver is in the first form, the rod is supported by the leg unit.

14. The printing apparatus according to claim 10, further comprising:

a flapper unit supported by the leg unit and configured to rotate between a first position and a second position different from the first position, wherein in a case in which the receiver is in the first form, a front end of the flapper unit in a case in which the flapper unit is at the first position is closer to the rod than in a case in which the flapper unit is at the second position.

15. The printing apparatus according to claim 10, wherein a height of the leg unit is greater than a height of the first supporting unit.

16. The printing apparatus according to claim 10, wherein the leg unit has a first leg on one side of the receiver in a width direction of the sheet and a second leg on the other side of the receiver.

* * * * *